(12) United States Patent
Daruwalla et al.

(10) Patent No.: US 6,693,878 B1
(45) Date of Patent: Feb. 17, 2004

(54) TECHNIQUE AND APPARATUS FOR USING NODE ID AS VIRTUAL PRIVATE NETWORK (VPN) IDENTIFIERS

(75) Inventors: Feisal Y. Daruwalla, Fremont, CA (US); James R. Forster, Los Altos, CA (US); Mark W. Litwack, West Chester, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/418,469

(22) Filed: Oct. 15, 1999

(51) Int. Cl.[7] .............................................. H04L 12/56
(52) U.S. Cl. .................. 370/235; 370/392; 370/395.31; 370/395.52; 370/397; 370/409; 709/238
(58) Field of Search ................................ 370/231, 235, 370/236, 352, 389, 392, 395.1, 396, 397, 395.3, 395.31, 395.5, 395.52, 400, 401, 409; 709/201, 203, 227, 232, 238, 243, 249

(56) References Cited

U.S. PATENT DOCUMENTS

| | | | | |
|---|---|---|---|---|
| 5,768,271 A | * | 6/1998 | Seid et al. .................. | 370/389 |
| 6,069,889 A | * | 5/2000 | Feldman et al. ............. | 370/351 |
| 6,137,793 A | * | 10/2000 | Gorman et al. ............. | 370/360 |
| 6,205,488 B1 | * | 3/2001 | Casey et al. ................. | 709/238 |
| 6,339,595 B1 | * | 1/2002 | Rekhter et al. .............. | 370/392 |
| 6,438,127 B1 | * | 8/2002 | Le Goff et al. ............. | 370/389 |
| 6,463,061 B1 | * | 10/2002 | Rekhter et al. .............. | 370/392 |

OTHER PUBLICATIONS

Rosen, et al., Request for Comments: 2547: BGP/MPLS VPNs, Internet Engineering Task Force, Mar. 1999.
Fox, et al., "Request for Comments: 2685: Virtual Private Networks Identifier," Internet Engineering Task Force, Sep. 1999.
Anonymous, "Deploying Cable–Based Access and Intranet Virtual Private Networks," Cisco Systems, Inc., Jun. 1999.

* cited by examiner

*Primary Examiner*—Alpus H. Hsu
(74) *Attorney, Agent, or Firm*—Beyer, Weaver & Thomas, LLP.

(57) ABSTRACT

A technique is provided for managing VPN packet flows over shared access data networks. Each node in the shared access network typically has an identifier or ID associated with it which is used at a Head End of the shared access network to uniquely identify that particular node from the other nodes in the network. According to the technique of the present invention, the node ID may be used at the Head End of the network to identify not only the corresponding node, but also to identify any virtual private networks (VPNs) of which the corresponding node is a member. Using the technique of the present invention, nodes which are members of the same VPN within a shared access network may exchange packets in a manner which does not require the packets to be routed outside the shared access network.

79 Claims, 12 Drawing Sheets

|     | 512 | 514 | 516 |
|---|---|---|---|
| 501 → | VPN1 | (Interface Cable 3/0.1) | IP Address <range 1> |
| 503 → | VPN2 | (Interface Cable 3/0.2) | IP Address <range 2> |
|  | ⋮ | ⋮ | ⋮ |
| 505 → | VPNn | (Interface Cable i/a.b) | IP Address <range z> |

|     | 610 | 614 |  |
|---|---|---|---|
| 601 → | MAC Address 1 | IP Address <range 1> |  |
| 603 → | MAC Address 2 | IP Address <range 1> | VPN1 |
| 605 → | MAC Address 3 | IP Address <range 1> |  |
|  | ⋮ | ⋮ |  |
| 607 → | MAC Address 21 | IP Address <range 2> |  |
| 609 → | MAC Address 22 | IP Address <range 2> | VPN2 |
| 611 → | MAC Address 23 | IP Address <range 2> |  |
|  | ⋮ | ⋮ |  |

Fig. 6

|     | 710 | 712 |
| --- | --- | --- |
| 701 → | SID1 | VPN1 |
| 703 → | SID2 | VPN1 |
|     | ⋮ | ⋮ |
| 705 → | SID20 | VPN2 |
| 707 → | SID21 | VPN2 |
|     | ⋮ | ⋮ |
| 709 → | SIDn | VPNz |

|     | 812 | 814 |
| --- | --- | --- |
| 801 → | Destination IP Address [Range1] | Next Hop1 |
| 803 → | Destination IP Address [Range2] | Next Hop2 |
|     | ⋮ | ⋮ |
| 805 → | Destination IP Address [all] | Next Hop (default) |

VPN1 Route Forwarding Table

TECHNIQUE AND APPARATUS FOR USING NODE ID AS VIRTUAL PRIVATE NETWORK (VPN) IDENTIFIERS

BACKGROUND OF THE INVENTION

This invention relates to digital computer network technology. More specifically, it relates to methods and apparatus for facilitating processing and routing of packets in Virtual Private Networks (VPNs).

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

A cable modem network or "cable plant" employs cable modems, which are an improvement of conventional PC data modems and provide high speed connectivity. Cable modems are therefore instrumental in transforming the cable system into a full service provider of video, voice and data telecommunications services. Digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's home. At a cable modem termination system ("CMTS") located at a Head End of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

FIG. 1 is a block diagram of a typical two-way hybrid fiber-coaxial (HFC) cable network system. It shows a Head End 102 (essentially a distribution hub) which can typically service about 40,000 homes. Head End 102 contains a CMTS 104 that is needed when transmitting and receiving data using cable modems. Primary functions of the CMTS include (1) receiving baseband data inputs from external sources 100 and converting the data for transmission over the cable plant (e.g., converting Ethernet or ATM baseband data to data suitable for transmission over the cable system); (2) providing appropriate Media Access Control (MAC) level packet headers for data received by the cable system, and (3) modulating and demodulating the data to and from the cable system.

Head End 102 connects through pairs of fiber optic lines 106 (one line for each direction) to a series of fiber nodes 108. Each Head End can support normally up to 80 fiber nodes. Pre-HFC cable systems used coaxial cables and conventional distribution nodes. Since a single coaxial cable was capable of transmitting data in both directions, one coaxial cable ran between the Head End and each distribution node. In addition, because cable modems were not used, the Head End of pre-HFC cable systems did not contain a CMTS. Returning to FIG. 1, each of the fiber nodes 108 is connected by a coaxial cable 110 to two-way amplifiers or duplex filters 112, which permit certain frequencies to go in one direction and other frequencies to go in the opposite direction (different frequency ranges are used for upstream and downstream paths). Each fiber node 108 can normally service up to 500 subscribers. Fiber node 108, coaxial cable 110, two-way amplifiers 112, plus distribution amplifiers 114 along with trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

In order for data to be able to be transmitted effectively over a wide area network such as HFC or other broadband computer networks, a common standard for data transmission is typically adopted by network providers. A commonly used and well known standard for transmission of data or other information over HFC networks is DOCSIS. The DOCSIS standard has been publicly presented as a draft recommendation (J.isc Annex B) to Study Group 9 of the ITU in October 1997. That document is incorporated herein by reference for all purposes.

Virtual Private Networks

As the Public Internet expands and extends its infrastructure globally, the determination to exploit this infrastructure has led to widespread interest in IP based Virtual Private Networks (VPNs). A VPN emulates a private IP network over public or shared infrastructures. A VPN that supports only IP traffic is called an IP-VPN. Virtual Private Networks provide advantages to both the service provider and its customers. For its customers, a VPN can extend the IP capabilities of a corporate site to remote offices and/or users with intranet, extranet, and dial-up services. This connectivity may be achieved at a lower cost to the customer with savings in capital equipment, operations, and services. The service provider is able to make better use of its infrastructure and network administration expertise offering IP VPN connectivity and/or services to its customers.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc.

A conventional technique for implementing a VPN across a wide area network may be accomplished through the use of an IP Security (IPSec) Protocol which establishes a secure IPSec "tunnel" between a remote user/node and a private LAN. An example of this is shown in FIG. 2 of the drawings. FIG. 2 shows a schematic block diagram of how an IPSec Protocol may be used to manage Virtual Private Network (VPN) flows over an HFC network. As shown in FIG. 2, the HFC network 220 comprises a plurality of cable modems, depicted by cable modems CM1–CM5. In the example of FIG. 2, it is assumed that cable modems CM4 and CM5 are remote nodes which are members of the Virtual Private Network VPN1. The VPN1 network is owned and/or managed by Enterprise A 250. The remaining cable modems in the cable network CM1, CM2, CM3 (collectively identified by reference number 205) are not members of any VPN.

In order for cable modem CM4 to communicate with the VPN1 network located at Enterprise A, it utilizes an IPSec Protocol to establish an IPSec "tunnel" 202a which provides a secure communication path from CM4, across the HFC network 220 and backbone network 230, to the VPN1 gateway 252. Likewise, in order for cable modem CM5 to connect to the virtual private network VPN1 located at Enterprise A, it utilizes the IPSec Protocol to establish a secure tunnel 204a across the HFC network 220 and backbone network 230 to connect into the virtual private network VPN1 via gateway 252.

Although the use of IPSec Protocol to manage VPN flows across a public network (as shown, for example, in FIG. 2) is advantageous in that it provides secure end-to-end data encryption, it also suffers from a number of disadvantages. For example, a significant amount of overhead (e.g. memory/processing resources) is required to run IPSec on the endpoints of the IPSec tunnel. Additionally, implementing a VPN using IPSec Protocol requires additional intelligence to be incorporated in each of the end devices (e.g., PCs, cable modems, gateways, etc.). In FIG. 2, for example, each cable modem wishing to be a member of a particular VPN must be configured to support IPSec Protocol, and must also be specifically configured to access a specific VPN gateway in order to access the VPN network. This technique of maintaining the intelligence in the end device (such as, for example a cable modem) may be considered undesirable, particularly where software upgrades, maintenance, diagnostics, etc. are frequently required.

Another disadvantage of the IPSec-implemented VPN (as shown in FIG. 2) is that the IPSec Protocol is set up such that the routing information embedded within a VPN packet can only be used by a specific VPN gateway, and can not be used by other switching or routing devices in the network to switch/route the VPN packet to its destination address. Thus, any data transmission between cable modem CM4 and cable modem CM5 must first be routed through VPN gateway 252, whereupon the VPN gateway then uses the routing information in the packet to route it to its final destination.

For example, if cable modem CM4 (FIG. 2) wishes to send a packet to cable modem CM5, conceivably it should be possible to route the packet locally, within the HFC network, without requiring that the packet be routed outside the HFC network (e.g. through the backbone network 230 or gateway 252). However, because each of the IPSec tunnels 202a and 204a have been set-up to be secure from end-to-end, the only way CM4 can communicate with CM5 is to first send the packet through gateway 252 via tunnel 202a, whereupon gateway 252 will then forward the packet to CM5 via tunnel 204a. Not only does this technique increase the communication delay between CM4 and CM5, but it also adds to traffic congestion across the backbone network 230 and gateway 252.

Accordingly, there exists a continual need to provide improved techniques for implementing and managing VPN flows over public or shared infrastructures.

SUMMARY OF THE INVENTION

According to specific embodiments of the present invention, a technique is provided for managing VPN packet flows over access networks such as, for example, cable networks or wireless networks in which the nodes of the network use a shared access channel to communicate with a Head End in the network. Each node in the access network typically has an identifier or ID associated with it which is used at the Head End to uniquely identify that particular node from the other nodes in the network. According to the technique of the present invention, and as explained in greater detail below, the node ID may be used at the Head End of the network to identify not only the corresponding node, but also to identify any virtual private networks (VPNs) of which the corresponding node is a member.

According to specific embodiments of the invention, a method and computer program product are provided for routing packets from a first network node to a second network node in a data network. The data network includes an access network having at least one Head End device and a plurality of nodes. The access network further includes at least one shared access channel used by the first and second nodes to communicate with the Head End device. The first and second nodes are members of a first virtual private network (VPN) which is associated with at least one first VPN Customer Edge device. A packet is received from the first node. The packet includes an ID associated with the first node and includes routing information for routing the packet to a destination address associated with the second node. The packet is then examined to identify the ID of the first node. Once identified, the first node ID is used to determine whether the first node is a member of at least one VPN. An additional aspect of this embodiment provides that the routing information within the packet may be used to determine whether the second node is a member of the same VPN as the first node. A further aspect of this embodiment provides that the packet may be routed to the second node in a manner that does not cause the packet to be routed outside the access network.

Further embodiments of the present invention provide a method and computer program product for associating nodes in a data network with at least one virtual private network. The data network includes an access network having at least one Head End device and a plurality of nodes. The access network further includes at least one shared access channel utilized by a first node and a second node of the plurality of nodes to communicate with the Head End device. When the first node communicates with the Head End device, a determination is made as to whether the first node is a member of at least one VPN. If it is determined that the first node is a member of at least one VPN, an ID of the first node will be mapped or linked to the particular VPN(s) of which the first node is a member. By linking or mapping the first node ID to any VPN(s) associated with the first node, the Head End is subsequently able to use the node ID-VPN association to route packets between nodes residing on the access network which are part of the same VPN. Moreover, an additional aspect of this embodiment provides that such packets may be routed between nodes within the access network belonging to the same VPN without routing the packet outside the access network.

Other embodiments of the present invention are directed to a method and computer program product for associating nodes in a data network with at least one virtual private network (VPN). The data network includes an access network having at least one Head End device and a plurality of nodes. The access network further includes at least one shared access channel utilized by a first and a second node of the plurality of nodes to communicate with the Head End device. A communication from the first node in the access network is received. An address of the first node is then identified, wherein the address is specific to the network on which the first node resides. The address is then used to determine whether the first node is associated with at least one VPN. According to one aspect of this embodiment, the address is an IP address of the first node. According to another aspect of this embodiment, the address is a MAC address of the first node.

An additional embodiment of the present invention provides a method of configuring a Head End of an access network to route packets from a first node to a second node in the network. The access network includes at least one shared access channel utilized by a plurality of nodes in the access network (including the first and second nodes) to communicate with the Head End. The first and second nodes are members of a first virtual private network which is associated with at least one first VPN Customer Edge device residing outside the access network. Particular network nodes on the access network are associated with corresponding VPNs. The first node is also assigned an ID specific to the access network. The assigned ID and the first VPN are then associated or linked together to thereby cause the first node to be associated with a first VPN. In one aspect of this embodiment, a provisioning server may be used to make the association between a particular network node on the access network and its corresponding VPN(s). Alternatively, a different aspect of this embodiment provides that the Head End or the CMTS is configured to make the association between a particular node of the access network and its corresponding VPN(s).

A further embodiment of the present invention is directed to a Head End of an access network. The network comprises a plurality of nodes which communicate with the Head End via at least one shared access channel. The Head End comprises at least one processor; memory in communication with the at least one processor; and at least one interface for communicating with the plurality of nodes. The Head End is configured or designed to manage virtual private network flows within the access network in a manner allowing routing of packets between at least two nodes in the network which are members of the same VPN. Further, the routing of packets between at least two nodes in the network which are members of the same VPN may be accomplished without routing such packets outside the access network. An additional aspect of this embodiment provides that the memory is configured or designed to store node ID information relating to the plurality of nodes in the network, where each node of the plurality of nodes is uniquely identified by a corresponding node ID. A further aspect of the this embodiment provides that the memory is also configured or designed to store node ID-VPN mapping information linking a particular node ID to at least one VPN of which the corresponding particular node is a member.

Additional features an advantages of the present invention will become apparent from the following descriptions of its preferred embodiments, which descriptions should be taken in conjunction with the accompanying drawings.

BRIEF DESCRIPTION OF THE DRAWINGS

FIG. 5 shows an example of a VPN/Sub-interface mapping table 500 in accordance with a specific embodiment of the present invention.

FIG. 6 shows an example of a MAC address/IP address mapping table 600 in accordance with a specific embodiment of the present invention.

FIG. 7 shows an example of a node ID-VPN mapping table 700 in accordance with a specific embodiment of the present invention.

FIG. 8 shows an example of a Virtual Route Forwarding (VRF) Table 800 in accordance with a specific embodiment of the present invention.

DETAILED DESCRIPTION OF THE PREFERRED EMBODIMENTS

Figure 3:
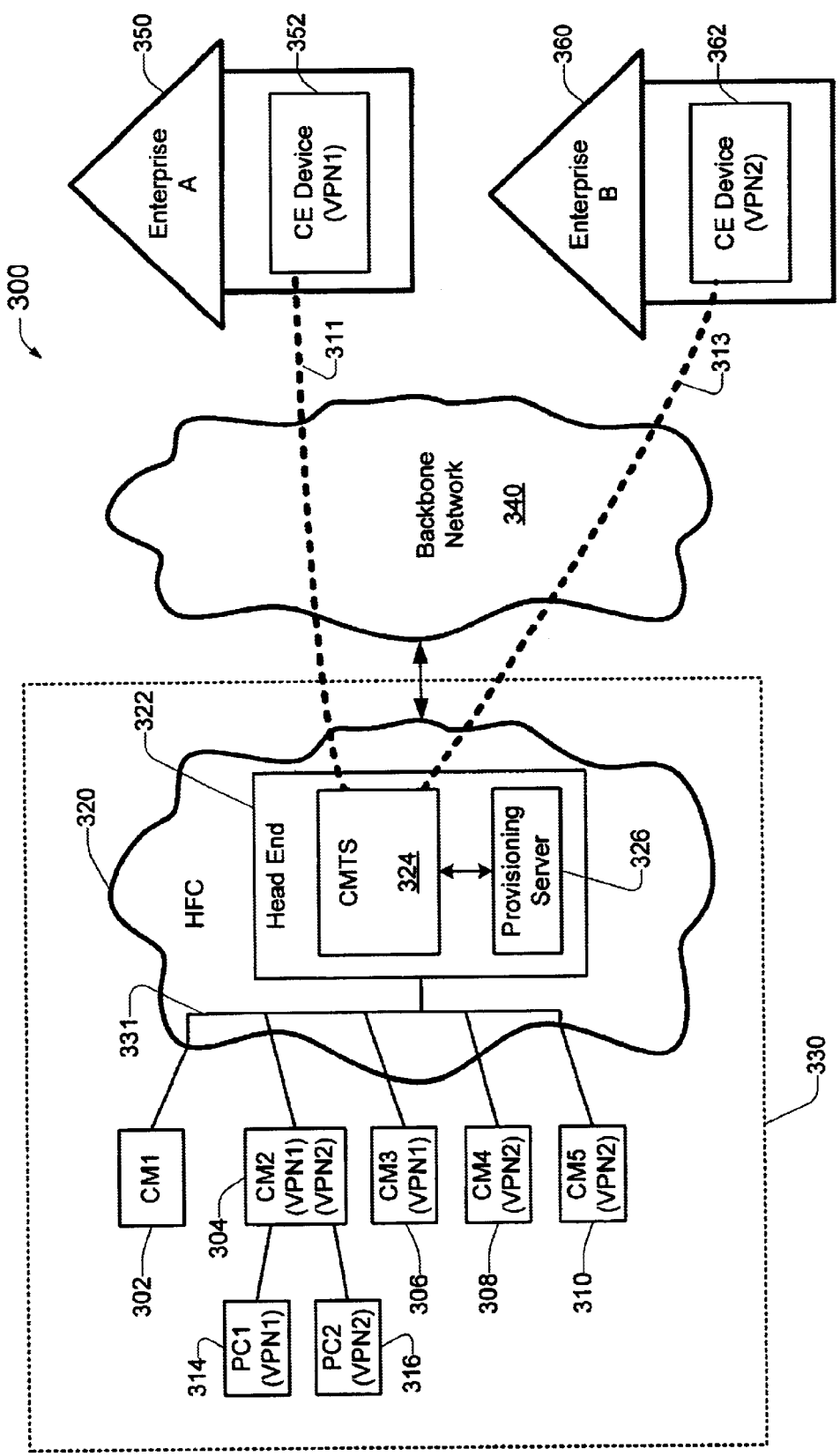
FIG. 3 shows a block diagram of a specific embodiment of the present invention for managing virtual private network flows over a data network.

FIG. 3 shows a block diagram of a data network 300, illustrating how the technique of the present invention may be used for managing virtual private network (VPN) flows over public or shared infrastructures. In the embodiments shown in FIG. 3 data network 300 includes at least one access network 330. The access network includes a plurality of nodes (e.g., 302, 304, 306, 308, 310) which communicate with a Head End 322 via a shared access channel 331. In the embodiment shown in FIG. 3, the access network 330 represents a high frequency cable network, where the plurality of nodes are cable modems (CM1-CM5) which communicate with the Head End 322 located at the high frequency cable plant (HFC) 320. Each of the cable modems may service one or more devices which sit behind the cable modem. For example, as shown in FIG. 3, cable modem CM2 (304) serves two PC devices 314 (PC1) and 316 (PC2). These PC devices may be part of a LAN which uses modem CM2 to access the backbone network and/or other networks outside the access network 330.

In a specific embodiment, the backbone network 340 is a Multiple System Operator (MSO) network which is a collection of many Head Ends and many CMTSs of different cable networks, all routed together using MPLS. It should be noted, therefore, that the technique of the present invention is not limited to implementation on a single CMTS.

The Head End of the cable network includes at least one CMTS 324 and may also include at least one provisioning server 326. In one embodiment, the provisioning server 326 may be used to assign IP addresses to cable modems within the network that request an IP address in order to communicate with nodes outside the cable network. For example, in a specific embodiment, the provisioning server 326 may be configured as a Dynamic Host Configuration Protocol (DHCP) server in order to provide requesting cable modems (or devices which sit behind the cable modems) with IP addresses from outside the address space of the CMTS interface. DHCP is described in RFC 2131, incorporated herein by reference for all purposes. Generally, in this protocol, the computer is told to ask the network, according to prescribed rules, for a temporary network address.

As commonly known to those skilled in the art, basic data connectivity on the cable network typically utilizes at least one upstream channel (to carry signals from a plurality of cable modems to the Head End) and at least one downstream channel (to carry signals from the Head End to the cable modems). On the downstream cable data channel, data is broadcast by the CMTS to cable modems served on that downstream channel. However, the upstream channel is complicated by the fact that it is used as a multiple shared access channel which is shared by the large group of cable modems (on that channel) to communicate with the CMTS. In a specific embodiment, the upstream channel is time-slotted, and cable modems need to contend for gaining access to the CMTS in this shared channel.

The example of FIG. 3 illustrates a data network 300 which includes two virtual private networks. The first virtual private network (identified as VPN1) is managed, owned, and/or otherwise operated by Enterprise A 350. Access to the virtual private network at Enterprise A is controlled via a Customer End or Customer Edge (CE) traffic handling device 352. The second virtual private network shown in FIG. 3 is identified VPN2 which is managed, owned, and/or operated by Enterprise B 360. Access to the virtual private network VPN2 at Enterprise B is controlled via CE device 362. Additionally, there may be other servers at both the enterprise and MSO network which control access to a particular VPN.

In the example of FIG. 3, cable modem CM3 (306) is a member of the virtual private network VPN1, and cable modems CM4 and CM5 (308, 310) are members of the virtual private network VPN2. Cable modem CM2 (304) is a member of both VPN1 and VPN2 since the devices which it serves (i.e. PC1 and PC2) are members of the VPN1 and VPN2 networks, respectively.

Figure 1:
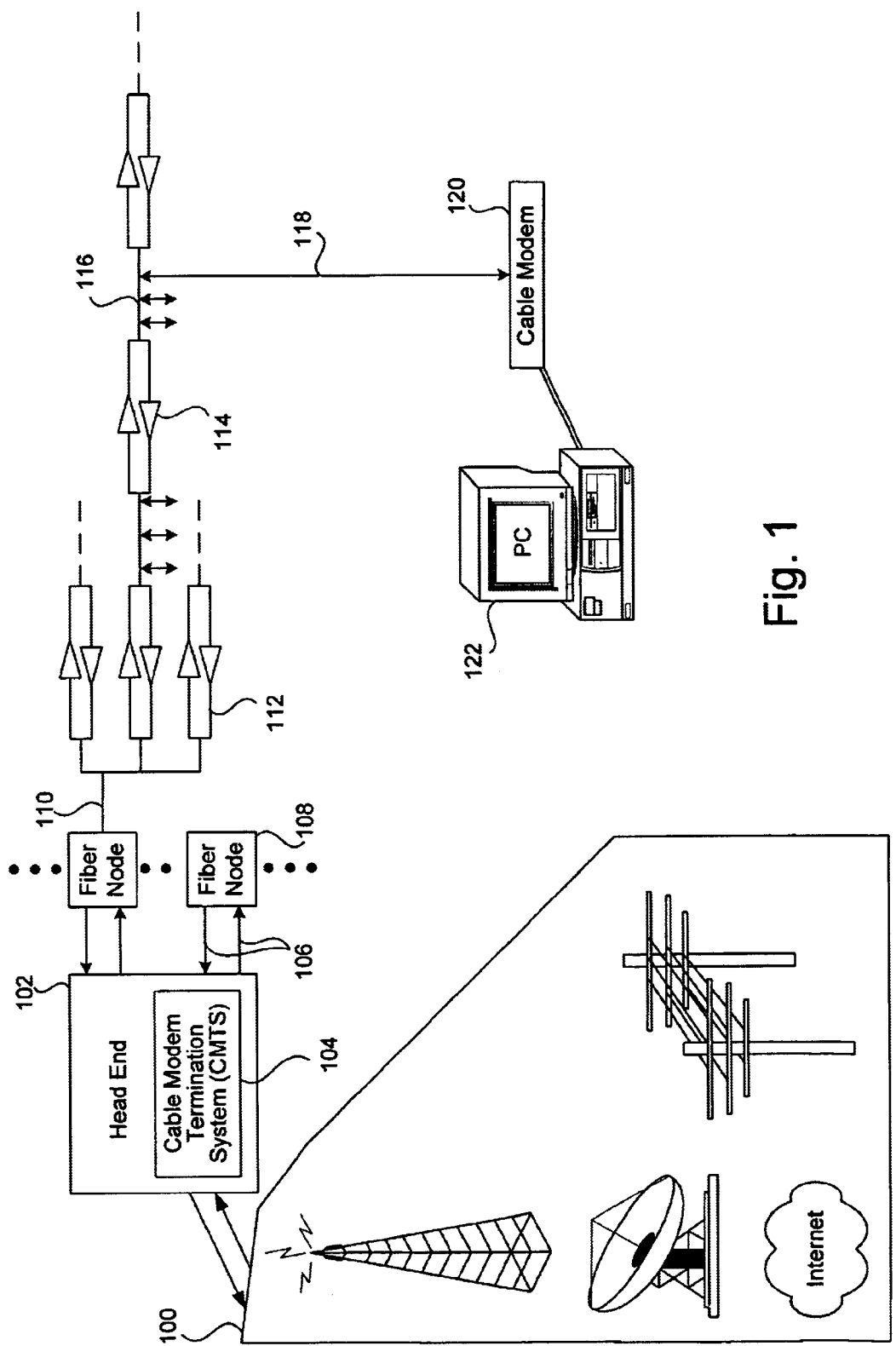
FIG. 1 is a block diagram depicting some of the principal components of a cable network that may be used with the present invention.
Figure 2:
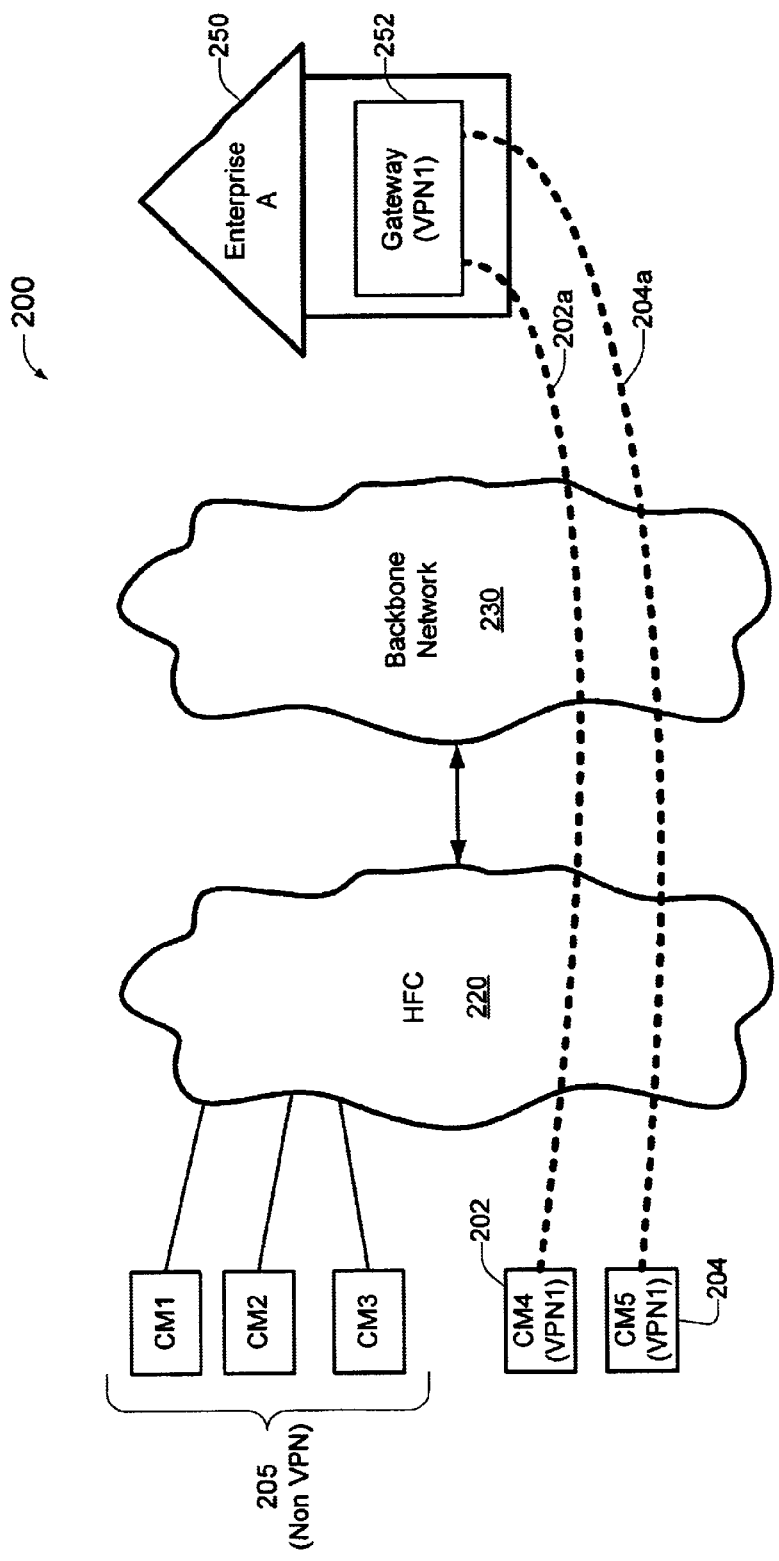
FIG. 2 shows a block diagram of a conventional technique for managing virtual private network flows over a cable network.

Conventionally, as described in the background of this application (with reference to FIG. 2), in order for a cable modem to communicate with a virtual private network of which it is a member, it uses an IPSec Protocol to establish a secure communication path (or IPSec tunnel) between the cable modem and an authorized VPN gateway. Moreover, the nature of IPSec Protocol allows only the authorized VPN gateway to access the routing information which has been embedded within an IPSec packet, and does not allow other switching or routing devices in the network to switch/route the IPSec packet to its destination address as specified by the routing information embedded within the packet.

However, using the technique of the present invention, VPN flows over public or shared infrastructures are able to be managed more efficiently and do not suffer from the same limitations as those described previously with respect to implementing VPNs using IPSec Protocol. For example, in the embodiment shown in FIG. 3, a Multiprotocol Label Switching (MPLS) Protocol is used for implementing and managing VPN flows across the access network 330.

MPLS VPN technology is described in detail in RFC Number 2547 by E. Rosen and W. Rekhter, March 1999, herein incorporated by reference in its entirety for all purposes. Utilizing MPLS VPN technology, the technique of the present invention enables cable operators and/or other shared access network operators to deliver secure, highly scalable intranet VPN services that support a variety of business operations. Quality of service (QoS) on MPLS VPNs may be delivered, for example, through a combined use of IP precedence type-of-service (ToS) bits and/or the QoS capabilities of IP or IP+ATM core networks. Security in MPLS-enabled VPN networks may be delivered, for example, through a combination of Border Gateway Protocol (BGP), IP address resolution, and/or optional IPSec encryption. Using the technique of the present invention, MPLS VPNs may be implemented over a cable operator's MPLS enabled private IP network, or it can span several service providers' MPLS enabled private IP networks with whom the cable operator has peering agreements (forming an MSO MPLS network).

Generally, the MPLS protocol uses tags for directing or managing VPN flows in a network. For example, an MPLS-enabled router (such as, for example, the uBR7200 router manufactured by Cisco Systems of San Jose, Calif.) places an appropriate "tag" on each packet so that the packet traverses the correct VPN. Because these "tags" are used to direct traffic, enterprise customers may use their internal address space across the MPLS VPN network.

Where additional security is desired, it is also possible to initiate an IPSec tunnel over the MPLS VPN to add encryption. Thus, for example, in one embodiment, a cable modem (such as, for example, CM3, FIG. 3) could initiate an IPSec tunnel over the MPLS VPN to CE device 352. While encryption is not essential to create a secure VPN, some industries require any traffic sent over public networks to be encrypted. Also, certain enterprise customers might want stronger encryption than 56-bit DES over the shared cable network, and might prefer to use triple-DES IPSec.

In order to implement an MPLS VPN-enabled cable network, it is preferable to identify the specific VPNs (if any) associated with each cable modem in the network. Conventional techniques for managing VPN flows over a cable network teach the desirability of maintaining intelligence in the end points of the network. That is to say, using conventional techniques, for example, each cable modem wishing to be a member of a particular VPN must be configured to support IPSec Protocol, and must also be specifically configured to access a specific VPN gateway in order to access the VPN network. Using the conventional IPSec technique for managing VPN flows over the cable network, the CMTS does not keep track of each cable modem and its associated VPNs since the intelligence for managing VPN flows is maintained in the end points (i.e., cable modem/VPN gateway).

However, contrary to conventional techniques which teach the desirability of maintaining intelligence in the end points of a network, the technique of the present invention takes a different approach whereby intelligence is maintained in the network rather than in the end points. More specifically, in the context of a cable network, the technique of the present invention provides intelligence in the Head End for managing VPN flows over the cable network. One advantage of this approach is that VPNs can be provisioned at the CMTS or Head End and can be used with any existing DOCSIS modem. Additionally, there is no need for special software and/or hardware at the modem end for managing VPN flows.

The technique of the present invention will now be described in greater detail with respect to FIG. 3 of the drawings. In the MPLS VPN enabled cable network of FIG. 3, the Head End 322 maintains a list of each of the cable modems in the network and any VPNs associated with each cable modem. In a specific embodiment, this information is maintained in the CMTS 324. In an alternate embodiment, this information is maintained or provided by provisioning server 326. A MPLS VPN communication path (311, 313) is established between the CMTS 324 and each of the respective VPN CE devices (352, 362). Intelligence is maintained in the CMTS for managing VPN flows between each of the respective VPN CE devices and the plurality of cable modems.

Encryption of packets between the CMTS and any of the VPN CE devices may be handled using conventional techniques. Encryption of packets sent between the CMTS and any of the cable modems in the network is based upon an ID of each cable modem, and therefore provides a unique encryption key for each cable modem in the network. This encryption is usually implemented using DOCSIS Baseline Privacy Interface (BPI), which is described in the specification for the DOCSIS standard.

When a particular cable modem belonging to a virtual private network (e.g., VPN1) wishes to send a packet to another node within that VPN, it first sends its packet to the CMTS 324. As explained in greater detail below, the CMTS uses the packet information to identify the source node (which sent the packet), and then determines whether or not the source node is associated with one or more VPNs. If it is determined that the source node is associated with a particular VPN (e.g. VPN1), the CMTS then consults a Virtual Route Forwarding (VRF) Table for that particular VPN (VPN1) in order to determine whether the packet may be forwarded to its destination address (specified in the packet's routing information). If the packet's destination address is specified in the VPN1 VRF Table, the CMTS forwards the packet to an appropriate next hop, as specified in the VPN1 VRF Table. An example of a VRF Table is shown in FIG. 8 of the drawings. If, however, the packet's destination address is not specified in the VPN1 VRF Table, the packet is dropped.

In order for the CMTS to manage MPLS VPN flows in the cable network, it is preferable that the CMTS be able to quickly and easily determine any and all VPNs associated with a particular cable modem in the network. In a specific embodiment, this may be accomplished by accessing a data structure which includes mapping information relating to at least a portion of cable modems in the network and their respective VPNs associations(if any).

As commonly known to those having skill in the art, there are a number of ways for the Head End to identify a particular cable modem in the network. For example, a cable modem may be identified by its MAC address, its DOCSIS service identifier (SID), its IP address, etc. The MAC address is hard coded into the cable modem (or each device sitting behind the cable modem), and is unique for each cable modem or device in the network. No two cable modems will have the same MAC address, however, it may be possible for one cable modem to have more than one different MAC address. Additionally, multiple SIDs may be assigned to a single MAC address.

The SID (service ID) is a DOCSIS MAC (layer 2) device and service identification which is assigned by the CMTS to each cable modem in the network. Because the SID may be expressed using a fewer number of bits than the corresponding MAC address for a particular cable modem, the SID is the preferred identifier for communications between a cable modem and the CMTS. In a specific embodiment of the present invention, the service ID or SID associated with a particular cable modem is also used as a VPN or sub-interface identifier whereby each SID corresponding to a particular cable modem is linked to information identifying the particular VPN/sub-interface to which that cable modem is to be mapped. In this way, VPN traffic flows may be separated at the CMTS based on the SID tag associated with a particular packet.

In the context of this invention, a sub-interface is a logical interface representing a portion of a physical network interface. For example, a single physical cable interface at a CMTS may be sub-divided into a plurality of logical sub-interfaces. In a specific embodiment of the present invention, each cable modem in the network belonging to a particular VPN will be mapped to a particular sub-interface at the CMTS.

Different mechanisms may be used to initially determine the particular VPN or network sub-interface to which a specific cable modem belongs. For example, the MAC address of the cable modem may be used to identify a particular VPN/sub-interface to which the cable modem belongs. Alternatively, the IP address assigned to the cable modem may be used to identify the particular VPN/sub-interface to which the cable modem belongs. Additionally, once a cable modem has been identified as being associated with a particular VPN/sub-interface, there are a number of techniques for the Head End to link or map that cable modem to that particular VPN/sub-interface. One such technique is illustrated in FIG. 4 of the drawings.

Figure 4:
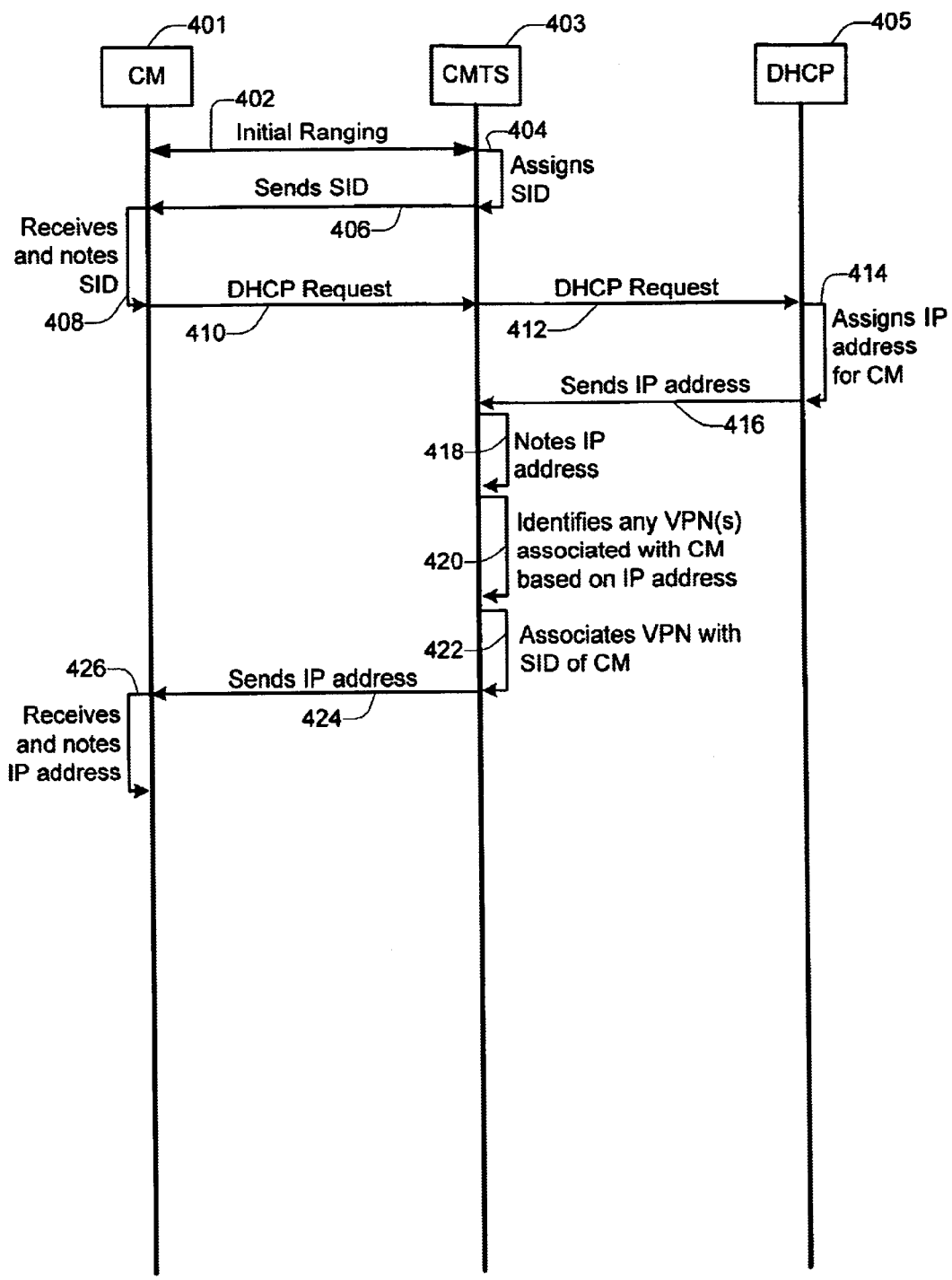
FIG. 4 shows an interaction diagram depicting the interactions of a cable modem, a CMTS, and a provisioning server during a VPN-associating phase in accordance with an embodiment of the present invention.

FIG. 4 shows an interaction diagram depicting the interaction of a cable modem (CM 401), a CMTS 403, and a provisioning server (DHCP Server) 405 during a VPN-associating phase in accordance with an embodiment of the present invention. Under the DOCSIS protocol, before a cable modem is able to send or receive packets to/from the CMTS, it first receives a SID assignment from the CMTS. In order to receive the SID assignment, the CM first performs initial ranging with the CMTS, as shown at 402. At 404, the CMTS assigns a SID to the CM and sends (406) the assigned SID to the CM, whereupon the CM receives and notes (408) the SID for future reference when communicating with the CMTS. At 410, the CM submits a DHCP request to the CMTS in order to receive an IP address. The CMTS forwards (412) the DHCP request to the DHCP server 405 (or other provisioning server, where appropriate). The DHCP server then assigns (414) an IP address to the requesting CM. In a specific embodiment, the DHCP server assigns an IP address based upon the MAC address of the cable modem. In order to make the IP address assignment, the DHCP server consults an address table or other data structure as shown for example in FIG. 6 of the drawing.

FIG. 6 shows an example of a MAC address/IP address mapping table 600 in accordance with a specific embodiment of the present invention. Table 600 of FIG. 6 has been provisioned to include a list of MAC addresses 610 corresponding to at least a portion of cable modems in the cable network. Each MAC address in table 600 is also provisioned to be associated with a specific range of IP addresses 614. When the DHCP server receives an IP address request from a specific cable modem, the server uses the MAC address of that cable modem to determine the appropriate address range from which to select and assign an IP address to the requesting CM, based upon Table 600. In a specific embodiment, the specific IP address range assigned to each MAC address in table 600 inherently corresponds to a particular VPN. Thus, for example, the cable modems corresponding to MAC addresses 1, 2, and 3, (601, 603, 605) of Table 600 have each been provisioned to be associated with the virtual private network VPN1, and therefore will each be assigned an IP address selected from the IP address range designated by "range 1". Similarly, the cable modems associated with MAC addresses 21, 22, 23 have each been provisioned to be associated with the virtual private network VPN2. Therefore, these cable modems and all other cable modems which are members of VPN2 will be assigned an IP address selected from the IP address range designated by "range 2" of Table 600.

When assigning IP addresses, it is possible for the IP address range associated with a first VPN in a first private IP network to overlap with the IP address range of a second VPN in a second private IP network. However, if a CM desires to sends packets outside of its own private IP network, it is preferable that the DHCP server assign a globally unique IP address to the requesting CM.

Furthermore, as stated previously, it is possible for a cable modem to have more than one MAC address. In a specific embodiment of the present invention, each MAC address may be associated with only one specific VPN. Therefore, if the cable modem is to be associated with two VPN(s) for example, then it is preferable that the cable modem have two separate MAC addresses, where each MAC address is associated with one of the VPNs of which the cable modem is a member. In this way, a first MAC address may be assigned an IP address corresponding to the IP address range associated with the first VPN, and the second MAC address may be assigned an IP address from the range corresponding to the second VPN. Moreover, in situations where the cable modem is associated with more than one VPN, the modem will typically be serving more than one device which sits behind the modem, where each device may be a member of separate VPN. This is shown, for example, in FIG. 3.

As shown in FIG. 3, cable modem CM2 (304) serves two PC devices which sit behind the modem 304. The first PC device PC1 (314) is a member of the virtual private network VPN1. The second PC device PC2 (316) is a member of the virtual private network VPN2. In an alternate embodiment (not shown), it is possible for either PC to be a member of both VPN1 and VPN2.

When a cable modem serves different devices which are members of different VPNs, the cable modem will be associated with all of the VPNs of all the devices the modem serves. In the example of FIG. 3, the cable modem CM2 is associated with both VPN1 and VPN2. In order to provide this multiple-VPN association, the cable modem must be able to furnish two different MAC addresses to the Head End, one MAC address for each separate VPN. In a specific embodiment, the MAC addresses are provided by each of the devices behind the cable modem. Thus, for example, the PC1 device 314 will supply a first MAC address to cable modem 304 when requesting an IP address, and PC device PC2 (316) will provide a second MAC address to the cable modem 304 when requesting its IP address. Cable modem 304 passes each of the IP address requests onto the CMTS, as shown, for example, in FIG. 4.

It is to be noted that each MAC address is assigned a unique SID by the CMTS. Using this technique, it is possible for a plurality of devices to be serviced by a single cable modem. Further, it is also possible to assign multiple SIDs to a modem via DOCSIS, and use the modem to sort traffic to the appropriate SID via layer 2 and/or layer 3 filtering.

Returning to FIG. 4, once the DHCP server selects and assigns a specific IP address for a requesting CM, the server sends (416) the assigned IP address to the CMTS. Before passing the assigned IP address to the requesting CM, the CMTS notes (418) the assigned IP address, and maps the modem to a particular sub-interface/VPN based on the assigned IP address. Thereafter, as explained in greater detail below, all packets subsequently received at the CMTS from a particular cable modem are mapped by the CMTS onto a particular sub-interface based upon the SID information in the packet.

According to a specific embodiment of the present invention, in order to map each modem in the network to a particular sub-interface/VPN, the CMTS identifies (420) any VPN(s) associated with a particular CM based on its assigned IP address. The CMTS may accomplish this task, for example, by consulting a VPN/Sub-interface table or other data structure as shown, for example, in the table 500 of FIG. 5.

FIG. 5 shows an example of a VPN/Sub-interface mapping table 500 in accordance with a specific embodiment of the present invention. Each entry in Table 500 (for example, entry 501) includes a first field, 512, identifying a particular VPN (e.g., VPN1); a second field, 514, identifying the particular interface cable slot number (e.g., 3), interface (e.g., 0), and sub-interface (e.g., 1), associated with that specific VPN; and a third field, 516, specifying an IP address range (e.g., range 1) associated with that particular VPN/sub-interface. When the CMTS receives an IP address assigned by the DHCP server, it consults the IP address range field 516 of Table 500 in order to determine which particular range the assigned IP address fits into. Once the proper IP address range has been identified, the CMTS is then able to identify the particular VPN associated with IP address range and also the cable interface information (e.g., slot, interface, sub-interface) associated with that particular IP address range. In accordance with one embodiment of the present invention, each VPN is assigned a unique sub-interface value. Thus, for example, referring to Table 500 of FIG. 5, all packets coming from cable modems belonging to VPN1 will be associated with sub-interface 1, and all packets coming from cable modems belonging to VPN2 will be associated with sub-interface 2.

Returning to FIG. 4, once the CMTS has identified any VPN(s) associated with a particular CM, the CMTS then associates or links (422) the identified VPN(s) with the SID of that particular CM. In a specific embodiment, this may be accomplished by using a table or other data structure to link each assigned SID in the network to a specific VPN/sub-interface, as shown, for example, in FIG. 7 of the drawings.

FIG. 7 shows an example of a node ID-VPN mapping table 700 in accordance with a specific embodiment of the present invention. Table 700 of FIG. 7 shows a list of SIDs 710 which correspond to specific cable modems in the network. Each SID entry in Table 700 is binded with or linked to an associated VPN 712, derived previously based upon the IP address assigned to that particular SID. It is possible for a SID not to be associated with an VPN, in which case field 712 would indicate a NULL VPN value. In a specific embodiment, the VPN field 712 is implemented using pointers which point to particular sub-interfaces in the cable network. Since there exists a 1:1 mapping between each specific sub-interface and its corresponding VPN, the CMTS is able to quickly identify the VPN/sub-interface associated with a particular SID by referencing Table 700 of FIG. 7. It is to be noted that there may also exist a sub-interface which is associated with a NULL VPN.

It is to be understood, however, that the mapping of a cable modem to a particular VPN/sub-interface may also be achieved by techniques other than that described in FIG. 4. For example, the MAC address, rather than the SID may be used as the key by which to determine the particular VPN(s) associated with a particular cable modem. Alternatively, the provisioning server (or DHCP server) could provide this mapping information along with the assigned IP address for a particular cable modem. The node ID-VPN association may also be assigned dynamically by a server other than the DHCP server. For example, it is possible to create a server which uses router commands or SNMP sets to modify the SID-VPN mapping. Furthermore, that server could also add new SID flows to a DOCSIS modem so that the modem could sort VPN flows by the use of layer 2 or layer 3 filter lists.

Returning to FIG. 4, when the CMTS associates (422) a specific VPN with the SID of a specific cable modem, it adds or modifies an entry within Table 700, specifying the SID and its associated VPN. The associating of a specific node to a particular VPN may also be subject to the approval of an authentication and/or authorization system.

After the CMTS has mapped the SID of a CM to a particular VPN/sub-interface, at 424, the CMTS sends the assigned IP address to the CM 401 whereupon the CM receives and notes (426) the assigned IP address. In a specific embodiment, it is possible for the CMTS to snoop the assigned IP address from the DHCP server and map the SID to a particular VPN/sub-interface concurrently, while sending the assigned IP address to the cable modem.

Handling VPN Flows in a Cable Network

Figure 9:
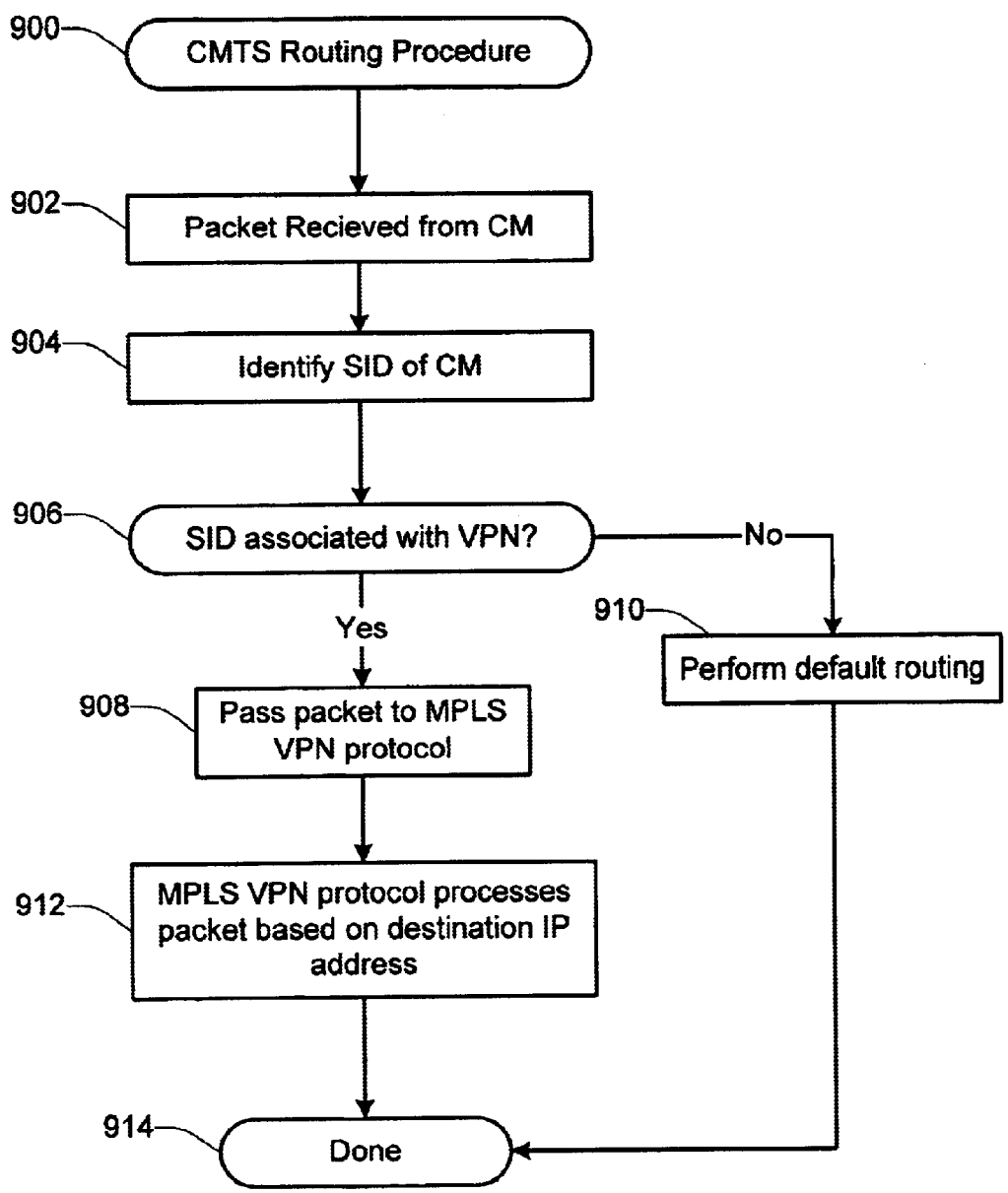
FIG. 9 shows a flow diagram of a CMTS routing procedure 900 in accordance with a specific embodiment of the present invention.

Typically the CMTS is responsible for routing packets in a cable network. In accordance with the technique of the present invention, the CMTS is provided with additional hardware and/or software in order to map each cable modem (SID) to a particular VPN/sub-interface, and to manage VPN flows over the cable network using an MPLS protocol. FIG. 9 shows a flow diagram of a CMTS routing procedure 900 which may be used for managing VPN flows over the cable network in accordance with a specific embodiment of the present invention.

At 902, a packet from a specific cable modem (CM) is received of the CMTS. The CMTS examines the packet to identify (904) the particular SID of that CM. The CMTS then determines (906) whether the SID is associated with a specific VPN/sub-interface. In a specific embodiment, the CMTS consults a SID/VPN mapping table (i.e., Table 700, FIG. 7) in order to make this determination. If it is determined that the SID is not associated with a particular VPN, at 910, the CMTS processes the packet using its default routing procedure. In specific embodiment, default routing will only be performed upon packets whose source node (i.e., SID) is not associated with any virtual private network.

However, if it determined that the SID is associated with a particular VPN at 908, the packet is passed to an MPLS VPN protocol. The MPLS VPN protocol then processes (912) the packet based upon an MPLS-VPN label (or tag) associated with the packet, or based upon the destination IP address specified in the packet's routing information. In a specific embodiment, the CMTS uses the packet's destination address to route the packet, and places a label on the packet identifying its associated VPN so that other traffic handling devices (e.g. routers, switches, etc.) along the way can route the packet to its destination address using the label information.

Figure 10:
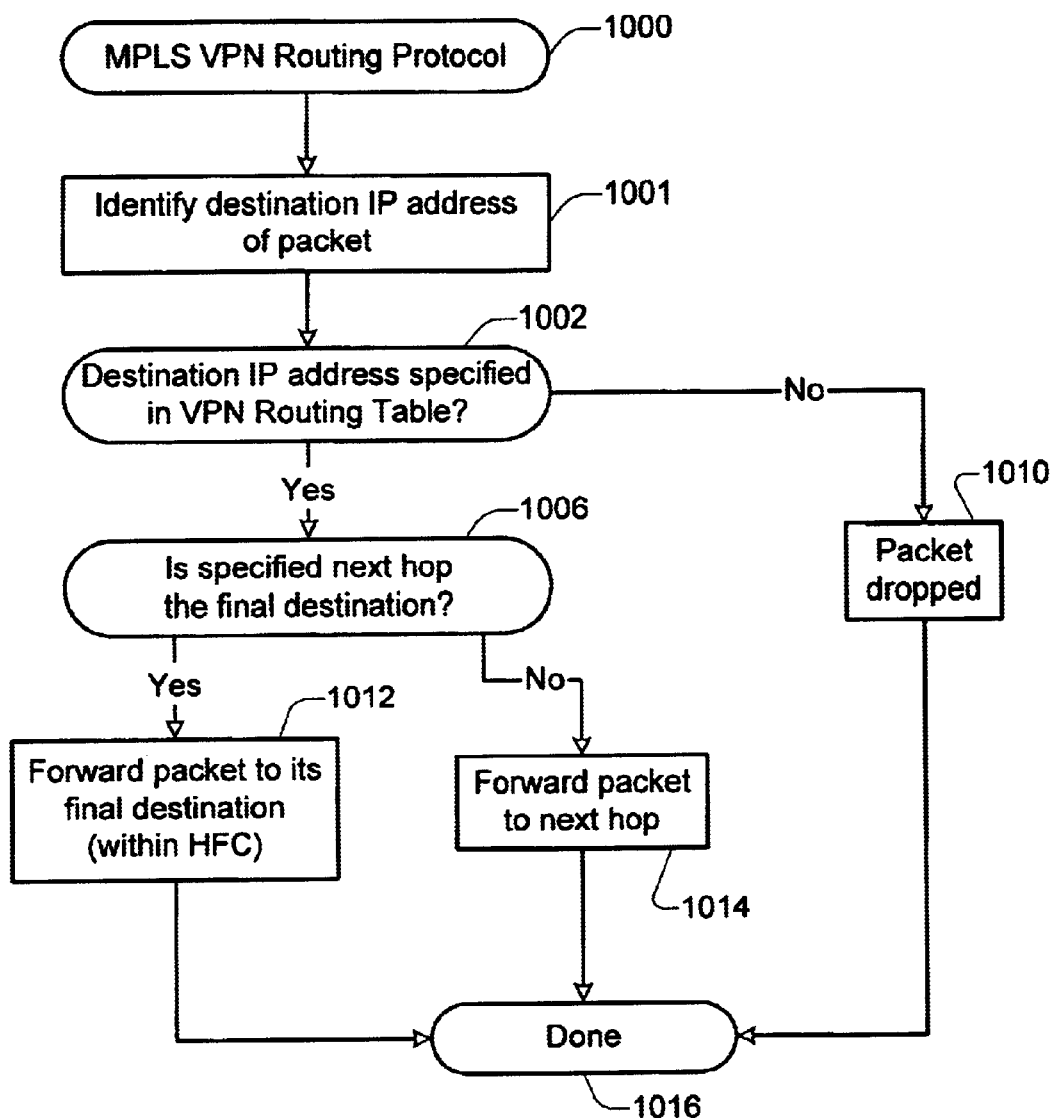
FIG. 10 shows a flow diagram of a MPLS VPN routing protocol 1000 in accordance with a specific embodiment of the present invention.

FIG. 10 shows a flow diagram of a specific embodiment of an MPLS VPN Routing Protocol 1000, as described previously, for example, with respect to blocks 908 and 912 of FIG. 9. The MPLS VPN Routing Protocol of FIG. 10 may be implemented at the CMTS using either hardware and/or software. This protocol is primarily used for routing packets originating from cable modems (or devices behind such cable modems) which have been associated with a particular VPN. At 1001, the packet is examined to determine its destination IP address. At 1002, a Virtual Route Forwarding (VRF) Table (or other data structure) specific to the packet's associated VNP is consulted in order to determine if the destination IP address is specified within any of the destination address ranges specified in the VRF table. An example of a VRF table is shown in FIG. 8 of the drawings.

FIG. 8 shows a specific embodiment of a Virtual Route Forwarding (VRF) Table 800 which may be used by the MPLS Protocol for managing VPN flows in an MPLS VPN-enabled network. In a specific embodiment, the CMTS (or Head End) will include multiple VRF Tables, wherein each table corresponds to a different VPN in the network. As an example, the VRF Table of FIG. 8 corresponds to the VPN1 network.

Each entry (e.g.801, 803, 805) within VRF table 800 includes a first field (812) specifying a specific destination IP address range, and second field (814) specifying a next hop for routing or switching packets associated with the corresponding IP address range specified in field 812. Thus, for example, entry 801 of Table 800 specifies an IP address range of [Range1], and a corresponding next hop (Next Hop1). Entry 802 of Table 800 specifies an IP address range of [Range2], and a corresponding next hop (Next Hop2). In a specific embodiment, it is possible for the address ranges of [Range1] and [Range2] to overlap. It is also possible to use other routing information or addresses other than IP addresses to route the VPN packet to its final destination. Additionally, as illustrated by entry 805, it is also possible to include a "catch all" entry in each VRF table, wherein the entire range of all IP addresses is specified, along with a corresponding next hop (which, for example, may be a default router). This entry is useful for routing a packet to a default router if the packet's destination address does not fall within any of the other destination address range entries (e.g. 801, 803) of Table 800. In an alternate embodiment where the "catch all" entry (805) is not included within Table 800, a packet may be dropped if its destination IP address is not recognized as being part of any of the address ranges specified in Table 800.

Returning to FIG. 10, when a packet is received at the CMTS from a cable modem associated with a particular VPN (e.g. VPN1), a determination is made (at 1002) as to whether the packet's destination IP address is specified within any of the address ranges included within the VRF Table associated with that particular VPN (e.g. VPN1 VRF Table). Thus, for example, using the packet's destination IP address, the CMTS will walk through the list of IP address ranges specified in Table 800 (FIG. 8). If the destination IP address falls within a specified IP address range (e.g. Range1), the CMTS identifies the next hop corresponding to the specified address range (e.g. Next Hop1). If, however, the packet's destination IP address is not recognized as being part of any of the address ranges specified in Table 800, the packet will be dropped (1010).

Assuming that the packet's destination IP address falls within a specified IP address range (e.g. Range1), a determination is made (1006) as to whether the specified next hop is the final destination. In this way the CMTS is able to directly route packets from one CM to another CM in the cable network which are both members of the same VPN. For example, if the specified next hop is the final destination, the CMTS then forwards (1012) the packet, either directly or indirectly, to the final destination node within the HFC network. Moreover, if the CMTS is directly connected to the final destination node (e.g. via a downstream channel), the CMTS may forward the packet directly to the final destination node (within the HFC network) by placing the packet on the appropriate downstream channel. However, if it is determined that the specified next hop is not the final destination, the packet is forwarded (1014) to the specified next hop, which may be a router or switch residing outside the access network.

Figure 3A:
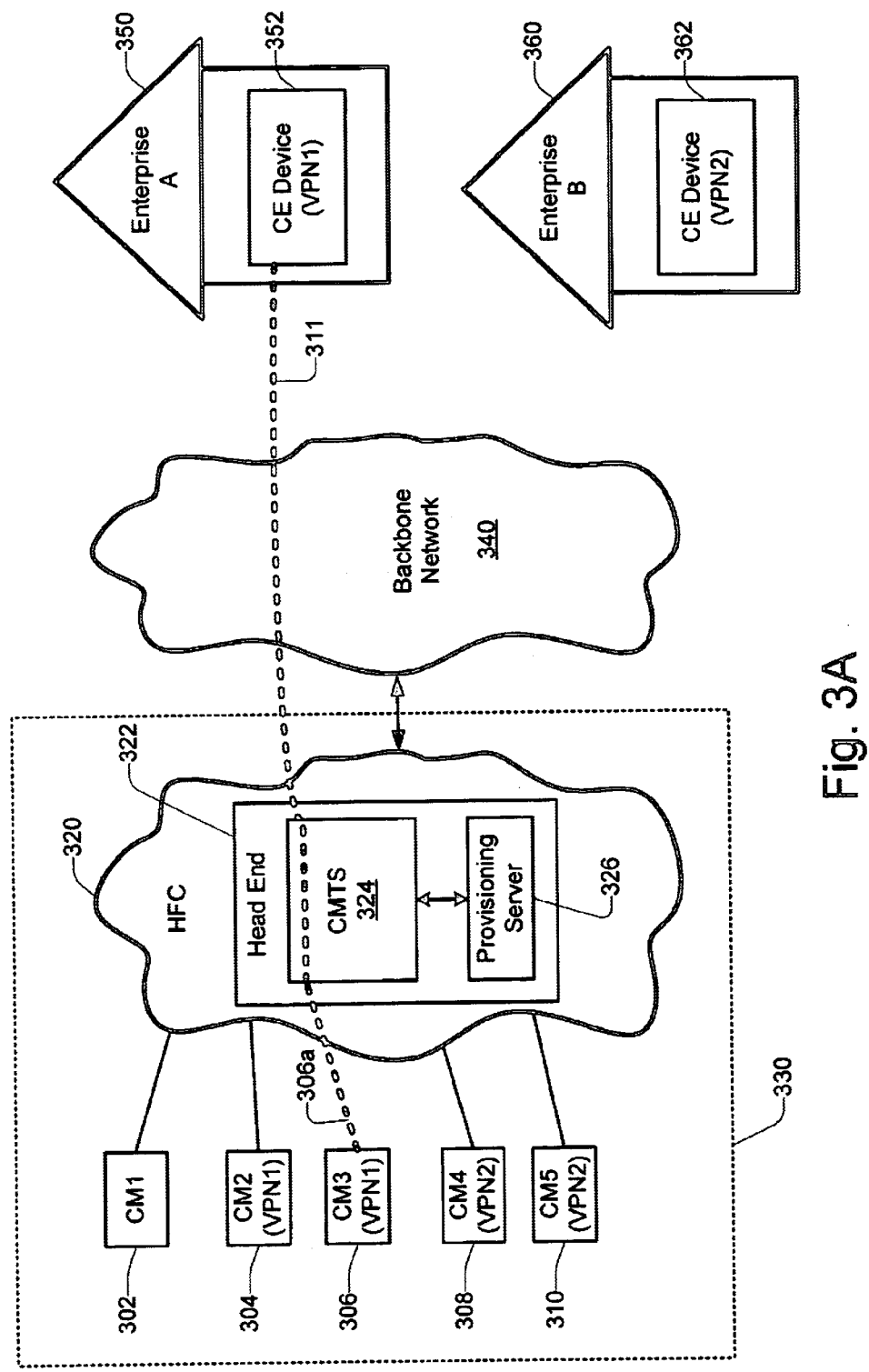
FIGS. 3A and 3B show block diagrams illustrating various types of virtual private network (VPN) flows over the data network of FIG. 3 in accordance with the technique of the present invention.
Figure 3B:
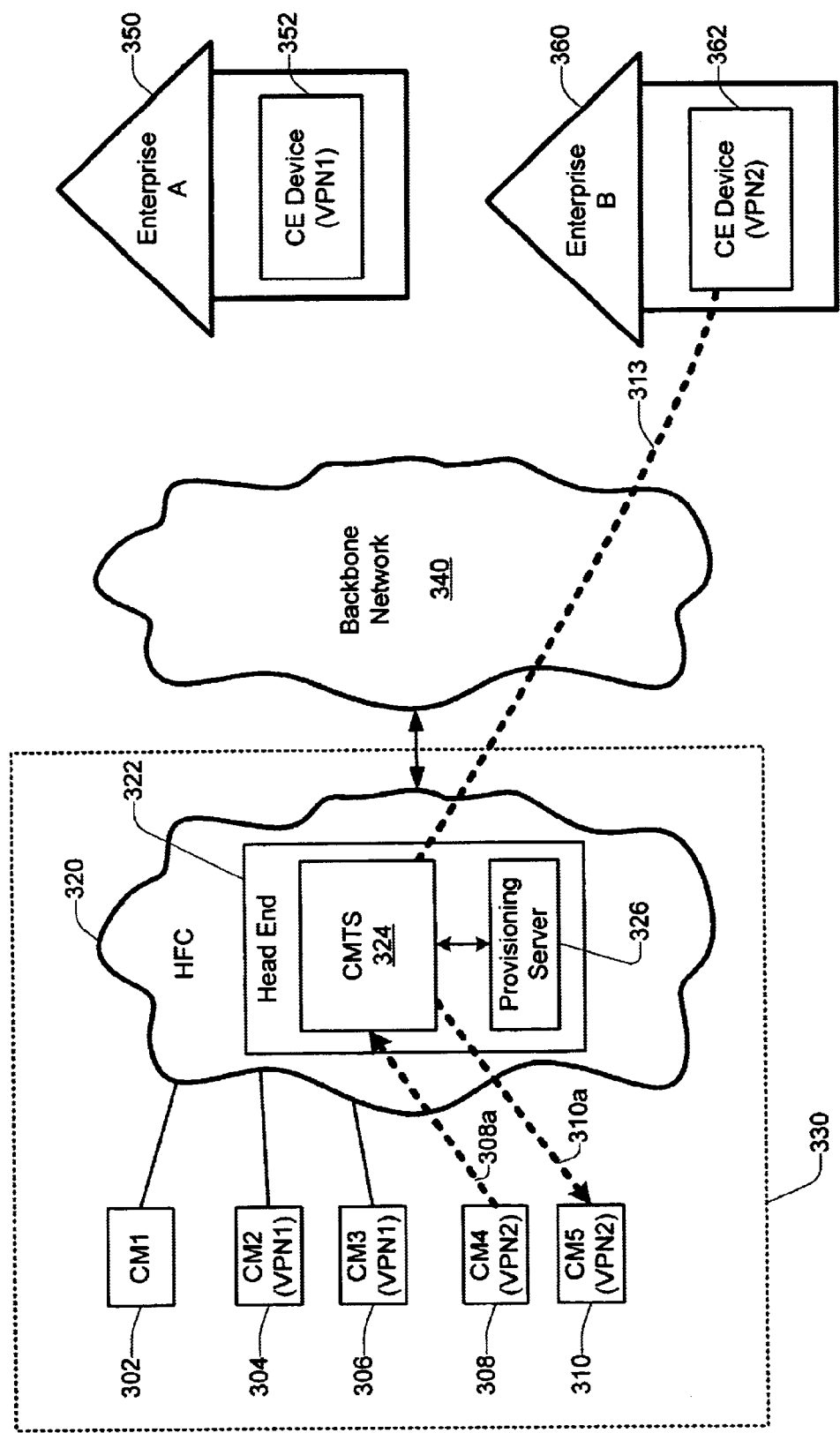

Examples of VPN Flows:

FIGS. 3A and 3B illustrate examples of different VPN flows which may occur within the data network 300 (FIG. 3) in accordance with a specific embodiment of the present invention.

In the example of FIG. 3A, we assume that cable modem 306 (CM3) is attempting to send a packet to a destination node residing at Enterprise A 350. When the CMTS 324 receives the packet from CM3, the CMTS identifies the SID associated with the packet and consults the SID/VPN mapping table 700 (FIG. 7) to determine if the identified SID is associated with a particular VPN/sub-interface. In a specific embodiment, the SID is pre-pended to the EP packet, and is part of the MAC header in the packet. In this example of FIG. 3A, the CMTS will determine that the SID identifying cable modem CM3 is associated with the virtual private network VPN1.

Next, the CMTS examines the packet's routing information in order to determine the destination IP address of the packet. Once the destination IP is obtained, the CMTS then consults the VRF Table associated with VPN1 (e.g. Table 800 of FIG. 8), in order to determine whether the packet's destination IP address falls within any of the recognized destination IP address ranges specified by the VPN1 VRF Table 800. Presumably, in the example of FIG. 3A, the packet's destination IP address will fall within one of the recognized destination IP address ranges specified in the VPN1 VRF Table (e.g. IP address range [Range1]), and the CMTS will route the packet, using an MPLS protocol, to the specified next hop (e.g. Next Hop1). The packet will eventually travel from the CMTS 324 to the VPN1 CE device 352 along a MPLS VPN communication path 311. Once the packet is received at CE device 352, it will be processed and routed to the appropriate destination node at Enterprise A.

In an alternate example, we assume that cable modem 306 (CM3) is attempting to send a packet to a destination node residing at Enterprise B (360). In this example, the packet's destination IP address may not fall within any destination IP address ranges specified by the VPN1 VRF Table 800. However, if a "catch all" entry (e.g. 805) is included in Table 800, the packet will be routed to a default router, whereupon the default router may route or drop the packet, as appropriate. If a "catch all" entry (e.g. 805) is not included in Table 800, the packet will be dropped.

Using the above-described technique of the present invention, each cable modem in the cable network which is associated with a specific VPN may communicate with other nodes outside the cable network which are also members of that particular VPN. Additionally, the MPLS protocol may be used to provide both security and encryption for communication between desired VPN nodes residing within the access network 330 and desired VPN nodes residing outside of the access network.

Additionally, as described in greater detail below, the technique of the present invention provides the added benefit of allowing nodes which are members of the same VPN residing in an access network to exchange packets in a manner that does not cause the packets to be routed outside of the access network. Unlike conventional VPN flow management techniques (e.g. IPSec) which require all packets sent from a first remote node to a second remote node in a VPN to be routed through a VPN gateway before reaching the final destination (i.e. second node), the technique of the present invention enables remote nodes of a VPN which reside on the same local network to communicate with each other in a manner that does not cause their respective packets to be routed outside of the local network on which the remote nodes reside. This feature is described in greater detail with respect to FIG. 3B of the drawings.

In the example of FIG. 3B, cable modem 308 (CM4) attempts to send a packet to cable modem 310 (CM5). Both the CM4 and CM5 modems (or the respective devices behind these modems—not shown) are members of the same VPN, namely VPN2. Conventionally, in order for CM4 to send a packet to CM5, the packet must first be routed out of the access network, through CE device 362 (FIG. 2), and then back to CMTS 324 where it is eventually forwarded to CM5. However, using the technique of the present invention, packets from CM4 may be routed to CM5 via CMTS 324 in a manner that does not require the packets to be routed through the VPN2 CE device 362 or even outside the cable operator's network.

More specifically, CM4 sends a packet to the CMTS via upstream channel 308a. The CMTS identifies the SID associated with CM4, and using Table 700 (FIG. 7) determines that CM4 is associated with the VPN2 network. The CMTS then examines the routing information to determine the destination IP address of the packet. Consulting a VRF Table associated with the VPN2 network (not shown), the CMTS determines that next hop specified for the packet's destination IP address is the CMTS. Next, as described in blocks 1006 and 1012 of FIG. 10, for example, the CMTS recognizes that the specified next hop is the final destination of the packet, and places the packet on the appropriate downstream channel (310a) to be received by CM5.

Thus, using the technique of the present invention, nodes which are members of the same VPN within an access network may exchange packets in a manner which does not require the packets to be routed outside the access network (e.g. cable operator's network). Not only is this feature advantageous in that it reduces communication delay between the source and destination nodes (as compared to conventional techniques), but it also has the advantage of decreasing traffic congestion across the backbone network 340, and CE device 362.

CMTS Configurations

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the methods of the present invention are implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces. One important class of device that may be used to implement the present invention is the cable modem termination system. Preferably, the CMTS is a "routing" CMTS, which handles at least some routing functions. Alternatively, the CMTS may be a "bridging" CMTS, which handles only lower-level tasks.

Figure 11:
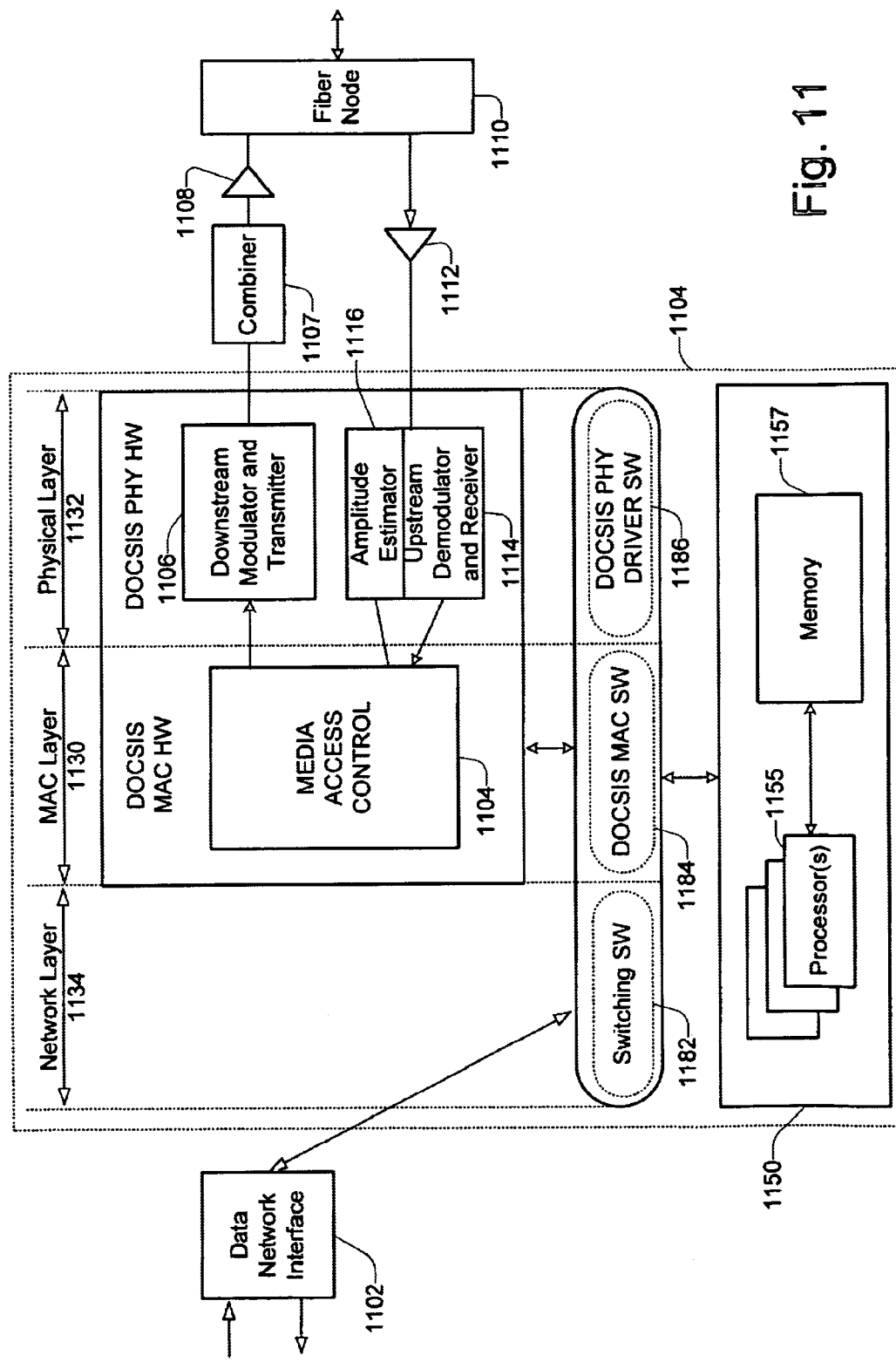
FIG. 11 shows a block diagram depicting a CMTS structure that may be employed with the present invention.

FIG. 11 provides an example of some components of a CMTS that may be used to implement certain aspects of this invention. In the specific embodiment as shown in FIG. 11, a CMTS 1104 provides functions on three network layers including a physical layer 1132, a Media Access Control (MAC) layer 1130, and a network layer 1134. Generally, the physical layer is responsible for receiving and transmitting RF signals on the cable plant. Hardware portions of the physical layer include a downstream modulator and transmitter 1106 and an upstream demodulator and receiver 1114. The physical layer also includes software 1186 for driving the hardware components of the physical layer.

Upstream optical data signals (packets) arriving via an optical fiber node 1110 are converted to electrical signals by a receiver 1112. Next, the upstream information packet (RF electrical signals) is demodulated by the demodulator/receiver 1114 and then passed to MAC layer block 1130. A primary purpose of MAC layer 1130 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. In October 1997, the DOCSIS standard was publicly presented as a draft recommendation (J.isc Annex B) to Study Group 9 of the ITU. That document is incorporated herein by reference for all purposes. The MAC headers include addresses to specific modems or to a hub (if sent upstream) by a MAC layer block 1130 in CMTS 1104. Note that the cable modems also include MAC addressing components. In the cable modems, these components encapsulate upstream data with a header containing the MAC address of the hub.

MAC layer block 1130 includes a MAC hardware portion 1104 and a MAC software portion 1184, which together serve the above-described functions. In a preferred embodiment, MAC hardware portion 1104 is distinct from the router's general-purpose microprocessor and is dedicated to performing some MAC layer functions.

After MAC layer block 1130 has processed the upstream information, it is then passed to network layer block 1134. Network layer block 1134 includes switching software 1182 for causing the upstream information packet to be switched to an appropriate data network interface on data network interface 1102. When a packet is received at the data network interface 1102 from an external source, the switching software within network layer 1134 passes the packet to MAC layer 1130. MAC block 1104 then transmits information via a one-way communication medium to downstream modulator and transmitter 1106. Downstream modulator and transmitter 1106 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 1107. An optical converter 1108 converts the modulated RF electrical signals to optical signals that can be received and transmitted via Fiber Node 1110 to the cable modem hub.

Note that alternate embodiments of the CMTS (not shown) may not include network layer 1134. In such embodiments, a CMTS device may include only a physical layer and a MAC layer, which are responsible for modifying a packet according to the appropriate standard for transmission of information over a cable modem network. The network layer 1134 of these alternate embodiments of CMTS devices may be included, for example, as part of a conventional router for a packet-switched network. In a specific embodiment, the network layer of the CMTS is configured as a cable line card coupled to a standard router that includes the physical layer block 1132 and MAC layer block 1130. Using this type of configuration, the CMTS is able to send and/or receive IP packets to and from the data network interface 1102 using switching software block 1182.

The data network interface 1102 is an interface component between external data sources and the cable system. The external data sources transmit data to the data network interface 1102 via, for example, optical fiber, microwave link, satellite link, or through various media. The data network interface includes hardware and software for interfacing to various networks such as, for example, Ethernet, ATM, frame relay, etc.

As shown in FIG. 11, CMTS 1104 includes a central hardware block 1150 including one or more processors 1155 and memory 1157. These hardware components interact with software and other hardware portions of the various layers within the CMTS. They provide general purpose computing power for much of the software. Memory 1157 may include, for example, I/O memory (e.g. buffers), program memory, shared memory, etc. The data structures described in this application may reside in such memory. Hardware block 1150 may physically reside with the other CMTS components. In one embodiment, the software entities 1182, 1184, and 1186 are implemented as part of a network operating system running on hardware 1150. Preferably, the VPN mapping and flow control functions of this invention are implemented in software as part of the operating system. In FIG. 11, such software may be part of MAC layer software 1184 and/or the switching software 1182, or may be closely associated therewith. Of course, the VPN mapping and flow control logic could reside in hardware, software, or some combination of the two.

The procedures employed by the CMTS during registration and pre-registration are preferably performed at the MAC layer of the CMTS logic. Thus, in CMTS 1104, most of the registration operations would be performed by the hardware and software provided for MAC layer logic 1130.

The operations associated with obtaining an IP address for cable modems are preferably implemented at the network layer level 1134. As noted, this may involve the CMTS communicating with a DHCP server via data network interface 1102, for example.

The VPN mapping and flow control techniques of this present invention may be implemented on various general purpose cable modem termination systems. In a specific embodiment, the systems of this invention may be specially configured CMTSs such as, for example, specially configured models in the uBR-7200 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 11 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 857) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

It will be appreciated by one having ordinary skill in the art that the technique of the present invention may be implemented in any computer network having a standardized protocol for utilizing a central termination system (e.g. head end) to schedule time slots for remote stations or nodes on a return (or upstream) channel. In wireless networks, the central termination system may be referred to as a head end or wireless base station. In satellite networks, the central termination system may be referred to as a master controlling station.

Other Embodiments

While the discussion to this point has focused on a VPN flow management technique for cable networks, the technology of the present invention may be applied to any shared-access network having a plurality of hosts or nodes which share at least one channel for communicating with at least one "head-end" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a router) for providing VPN flow management in a network having at least one traffic handling device (e.g., another router) that provides normal service to a host. In the wireless system (e.g., represented by FIG. 12) the plurality of nodes or hosts corresponds to the plurality of wireless nodes 1250 which use at least one shared access channel to communicate with at least one access control system 1222 located at the head end of the wireless system.

Figure 12:
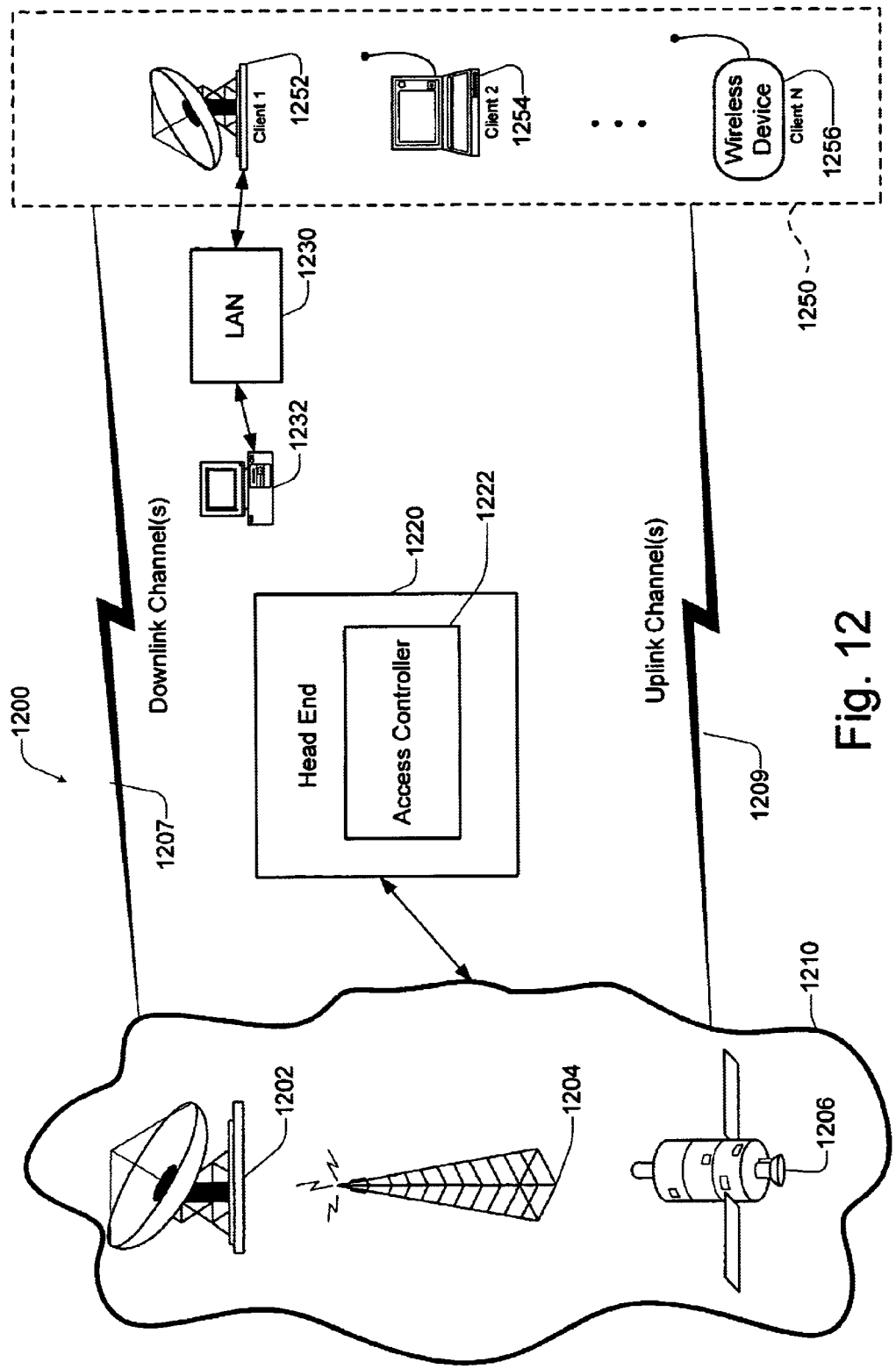
FIG. 12 shows a schematic illustration of a wireless network suitable for implementing the present invention.

As shown in FIG. 12, the wireless system includes a central termination system (or head end) 1220. The head end includes an access controller or access control system (ACS) 1222 which communicates with a plurality of wireless nodes 1250, and coordinates access between each of the wireless nodes and the head end 1220. The access controller 1222 may include memory and at least one processor. In a specific embodiment, the function of the access controller 1222 is analogous to that of the CMTS described above with respect to cable modem networks. It may serve as a router as well.

The head end 1220 communicates with a plurality of wireless nodes 1250 via any one of a plurality of wireless transmitting and receiving devices 1210. As shown in FIG. 12, for example, the plurality of wireless transmitting and receiving devices 1210 may include satellite base stations 1202, orbital satellites 1206, radio towers 1204, etc.

In a specific embodiment which is analogous to that of cable modem networks, the head end 1220 of the wireless computer system communicates with the plurality of nodes 1250 via one or more downlink channels 1207 and one or more uplink channels 1209. Each downlink channel 1207 is a broadcast-type channel utilized by the head end to communicate with an associated group of wireless nodes within the wireless network. The uplink channel 1209 is a shared-access channel, which is utilized by a group of wireless nodes (analogous to cable modems) to communicate with the head end 1220. The access controller 1222 stores registration parameters for the various nodes that it services. It may also store the IP addresses for nodes that it services.

In a specific embodiment of the present invention, the registration process and information is similar to that of the cable network CMTSs described above. Moreover, the technique of the present invention for managing VPN flows over a shared access data network may be implemented in wireless system 1200.

The wireless devices or nodes 1250 may include any one of a number of wireless transmitting/receiving devices. For example, a satellite dish 1252 may be used to communicate with the head end 1220 via the uplink and downlink channels. The satellite dish may, in turn, be connected to a local area network (LAN) 1230 which, may be further connected to one or more computer systems 1232. Another wireless device may be a portable/wireless computer system 1254, which is able to transmit and receive information to the head end via uplink and downlink channels 1207 and 1209. Other wireless devices 1256 may include, for example, wireless telephones, handheld computing devices, etc.

In specific embodiments where the uplink and downlink channels within the wireless system 1200 are utilized in a manner similar to that of the upstream and downstream channels of a cable modem network, the above-described VPN flow management techniques may easily be implemented in wireless system 1200 using the detailed description of the present invention provided herein. Moreover, the technique of the present invention may be easily implemented in any computer network which uses shared access channels for communicating between a centralized computing system and one or more remote nodes.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

It is claimed:

1. A method of routing packets from a first network node to a second network node in a data network, the data network including an access network having at least one Head End device and a plurality of nodes, the access network further including at least one shared access channel utilized by the first and second nodes to communicate with the Head End device, said first and second nodes being members of a first Virtual Private Network (VPN), said first VPN being associated with at least one first VPN customer edge device, said method comprising:

assigning an ID to the first node that is associated with at least one VPN, wherein the ID is assigned by an entity other than the first node;

receiving a packet from the first node, said packet including the ID associated with said first node, and including routing information for routing said packet to a destination address associated with said second node;

examining the packet to identify the ID of the first node; and using said first node ID to determine whether said first node is associated with at least one VPN.

2. The method of claim 1 further comprising using said routing information to determine whether said second node is associated with said at least one VPN.

3. The method of claim 2 wherein said using said routing information to determine whether said second node is associated with said at least one VPN includes examining said destination address within the routing information of said packet.

4. The method of claim 2 wherein using said routing information to determine whether said second node is associated with said at least one VPN includes examining a routing table specific to the virtual private network associated with the first node, said routing table including information relating to:

a reference to said first VPN; and a range of node addresses associated with said first VPN.

5. The method of claim 2 further comprising routing the packet to the second node in a manner that does not cause the packet to be routed through the first VPN customer edge device.

6. The method of claim 2 further comprising routing the packet to the second node in a manner that does not cause the packet to be routed outside the access network.

7. The method of claim 1 wherein said method is implemented at the Head End device.

8. The method of claim 1, wherein the network on which the first and second network nodes reside is a cable network.

9. The method of claim 8 wherein said first and second nodes are cable modems.

10. The method of claim 8 wherein said Head End device includes at least one cable modem termination system (CMTS), and wherein the method is implemented on said at least one CMTS.

11. The method of claim 1, wherein the ID of the first node is specific to the network on which the first and second network nodes reside.

12. The method of claim 11, wherein the ID of the first node is a DOCSIS Service ID for the first node.

13. The method of claim 11, wherein the ID is a MAC address of the first node.

14. The method of claim 11, wherein the ID is an IP address associated with the first node.

15. The method of claim 1, wherein using said first node ID to determine whether said first node is associated with at least one VPN comprises locating the ID in a list of IDs and noting at least one corresponding virtual private network associated with said ID.

16. The method of claim 1, wherein the virtual private network uses a Multiprotocol Label Switching Protocol (MPLS).

17. A method of associating nodes in a data network with at least one virtual private network (VPN), the data network including an access network having at least one Head End device and a plurality of nodes, the access network further including at least one shared access channel utilized by a first and a second node of the plurality of nodes to communicate with the Head End device, said method comprising:

assigning an address to the first node that is associated with at least one VPN, wherein the address is assigned by an entity other than the first node;

receiving a communication from the first node in the access network;

identifying the address of the first node, wherein the address is specific to the network on which the first node resides; and using said address to determine whether said first node is associated with at least one VPN.

18. The method of claim 17 wherein said address is an IP address of said first node.

19. The method of claim 17 wherein said address is a MAC address of said first node.

20. The method of claim 17 further comprising mapping said first node to a particular sub-interface on the access network based upon the address of the first node.

21. The method of claim 17 further comprising mapping said first node to a particular sub-interface on the access network based upon the identified VPN associated with the first node.

22. A method of associating nodes in a data network with at least one virtual private network (VPN), the data network including an access network having at least one Head End device and a plurality of nodes, the access network further including at least one shared access channel utilized by a first and a second node of the plurality of nodes to communicate with the Head End device, said method comprising:

determining whether said first node is a member of at least one VPN; and if it is determined that said first node is a member of at least one VPN, binding an ID of said node with said VPN to thereby cause said first node to be associated with said VPN, wherein the ID is bound with the node by an entity other than the node.

23. The method of claim 22, wherein determining whether the first node is a member of at least one VPN comprises using an IP address of said first node to identify a particular virtual private network associated with said first node.

24. The method of claim 23 further including mapping a particular sub-interface of the Head End to said particular VPN.

25. The method of claim 22, wherein determining whether the first node is a member of at least one VPN comprises using a MAC address of said first node to identify a particular virtual private network associated with said first node.

26. The method of claim 25 further including mapping a particular sub-interface of the Head End to said particular VPN.

27. The method of claim 22 further comprising:

receiving at said Head End device a packet from said first node, said packet including a destination address corresponding to a second node in the network;

examining said packet to identify the ID of said first node; and using said ID at said Head End device to determine whether said first node is a member of at least one VPN.

28. The method of claim 27 further comprising:

if it is determined that said first node is a member of a first VPN, determining at said Head End device whether the destination address of said packet is within said first VPN.

29. The method of claim 27 further comprising routing the packet to the second node in a manner that does not cause the packet to be routed through a VPN customer edge device associated with the VPN.

30. The method of claim 27 further comprising routing the packet to the second node in a manner that does not cause the packet to be routed outside the access network.

31. The method of claim 22 wherein said method is implemented at the Head End device.

32. The method of claim 22, wherein the network on which the first and second network nodes reside is a cable network, and wherein said first and second nodes are cable modems residing on the cable network.

33. The method of claim 32 wherein said Head End device includes at least one cable modem termination system (CMTS), and wherein the method is implemented on said at least one CMTS.

34. The method of claim 22, wherein the ID of the first node is specific to the network on which the first and second network nodes reside.

35. The method of claim 34, wherein the ID of the first node is a DOCSIS Service ID for the first node.

36. The method of claim 34, wherein the ID is a MAC address of the first node.

37. The method of claim 34, wherein the ID is an IP address associated with the first node.

38. The method of claim 22, wherein said Head End includes a list of IDs assigned to respective nodes in said network, and wherein said binding includes providing a pointer from a reference designating the first node ID in said list of IDs to a reference to the at least one VPN of which the first node is a member.

39. The method of claim 27 wherein said using said ID to determine device whether said first node is a member of at least one VPN includes locating the first node ID in a list of IDs and noting at least one corresponding VPN associated with said first node.

40. The method of claim 22, wherein the virtual private network uses a Multiprotocol Label Switching Protocol (MPLS).

41. A method of configuring a Head End of an access network to route packets from a first node to a second node in the access network, the access network including at least one shared access channel utilized by a plurality of nodes in the access network to communicate with the Head End, the Head End including a plurality of sub-interfaces for managing virtual private network (VPN) traffic over the access network, the first and second nodes being members of a first Virtual Private Network (VPN), the method comprising:
associating particular network nodes on the access network with at least one corresponding virtual private network;
assigning to the first node an ID specific to the access network, wherein the ID is assigned to the first node by an entity other than the first node; and
associating the assigned ID with the first VPN to thereby cause the first node to be associated with the first VPN.

42. The method of claim 41, wherein associating particular network nodes on the access network with at least one VPN comprises configuring a provisioning server to make the association, wherein the provisioning server also assigns IP addresses to network nodes on the access network.

43. The method of claim 41, wherein associating particular network nodes on the access network with at least one VPN comprises using an IP address of said first node to identify a particular virtual private network associated with said first node.

44. The method of claim 43 further including mapping a particular sub-interface of the Head End to said particular VPN.

45. The method of claim 41, wherein associating particular network nodes on the access network with at least one VPN comprises using a MAC address of said first node to identify a particular virtual private network associated with said first node.

46. The method of claim 45 further including mapping a particular sub-interface of the Head End to said particular VPN.

47. The method of claim 41, wherein the first node ID is a DOCSIS Service ID.

48. The method of claim 41, wherein the ID is a MAC address of the first node.

49. The method of claim 41, wherein the access network is a cable network, and wherein said first and second nodes are cable modems residing on the cable network.

50. The method of claim 41, wherein associating the assigned ID with the first virtual private network comprises providing a pointer from a reference designating the assigned ID in a list of assigned IDs to a reference to the first virtual private network.

51. A computer program product for associating nodes in a data network with at least one virtual private network (VPN), the data network including an access network having at least one Head End device and a plurality of nodes, the access network further including at least one shared access channel utilized by a first and a second node of the plurality of nodes to communicate with the Head End device, the computer program product comprising:
a computer usable medium having computer readable code embodied therein, the computer readable code comprising:
computer code for determining whether said first node is a member of at least one VPN; and
computer code for binding an ID of said node with said VPN to thereby cause said first node to be associated with said VPN, if it is determined that said first node is a member said VPN, wherein the ID is bound with the node by an entity other than the node.

52. The computer program product of claim 51 further comprising:
computer code for receiving at said Head End device a packet from said first node, said packet including a destination address corresponding to a second node in the network;
computer code for examining said packet to identify the ID of said first node; and
computer code for using said ID at said Head End device to determine whether said first node is a member of at least one VPN.

53. The computer program product of claim 52 further comprising computer code for routing the packet to the second node in a manner that does not cause the packet to be routed through a VPN customer edge device associated with the at least one VPN.

54. The computer program product of claim 52 further comprising computer code for routing the packet to the second node in a manner that does not cause the packet to be routed outside of the access network.

55. A computer program product for routing packets from a first network node to a second network node in a data network, the data network including at least one Head End device and a plurality of nodes, the network further including at least one shared access channel utilized by the first and second nodes to communicate with the Head End device, said first and second nodes being members of a first Virtual Private Network (VPN), said first VPN being associated with at least one first VPN customer edge device, said computer program product comprising:
a computer usable medium having computer readable code embodied therein, the computer readable code comprising:

computer code for assigning an ID to the first node that is associated with at least one VPN wherein the ID is assigned by an entity other than the first node;

computer code for receiving a packet from the first node, said packet including the ID associated with said first node, and including routing information for routing said packed to a destination address associated with said second node;

computer code for examining the packet to identify the ID of the first node; and computer code for using said first node ID to determine whether said first node is a member of at least one VPN.

56. The computer program product of claim 55 further comprising computer code for using said first node ID and said routing information to verify that said first node and said second node are both members of the same VPN.

57. The computer program product of claim 56 further comprising computer code for routing the packet to the second node in a manner that does not cause the packet to be routed outside of the access network.

58. The computer program product of claim 56 further comprising computer code for routing the packet to the second node in a manner that does not cause the packet to be routed through the first VPN customer edge device.

59. A computer program product for associating nodes in a data network with at least one virtual private network (VPN), the data network including an access network having at least one Head End device and a plurality of nodes, the access network further including at least one shared access channel utilized by a first and a second node of the plurality of nodes to communicate with the Head End device, the computer program product comprising:

a computer usable medium having computer readable code embodied therein, the computer readable code comprising:

computer code for assigning an address to the first node that is associated with at least one VPN, wherein the address is assigned by an entity other than the first node, computer code for receiving a communication from the first node in the access network;

computer code for identifying the address of the first node, wherein the address is specific to the network on which the first node resides;

computer code for using said address to determine whether said first node is associated with at least one VPN.

60. The computer program product of claim 59 wherein said address is an IP address of said first node.

61. The computer program product of claim 59 wherein said address is a MAC address of said first node.

62. The computer program product of claim 59 further comprising computer code for mapping said first node to a particular sub-interface on the access network based upon the address of the first node.

63. The computer program product of claim 59 further comprising computer code for mapping said first node to a particular sub-interface on the access network based upon the identified VPN associated with the first node.

64. A Head End of an access network, the network comprising a plurality of nodes, including a first node and a second node, which communicate with the Head End via at least one shared access channel, the Head End comprising:

at least one processor;

memory in communication with said at least one processor; and at least one interface for communicating with the plurality of nodes;

said Head End being configured or designed to manage Virtual Private Network (VPN) flows within said access network in a manner allowing routing of packets between at least two nodes in the network which are members of the same VPN, wherein the routing of a packet between said at least two nodes is accomplished without routing the packet outside the access network, wherein said management of VPN flows includes:

assigning a node ID to a first node that is associated with at least one VPN, wherein the ID is assigned by an entity other than the first node;

receiving a packet from the first node, said packet including the node ID associated with said first node, and including routing information for routing said packet to a destination address associated with a second node;

examining the packet to identify the node ID of the first node; and using the node ID of the first node to determine whether said first node is associated with at least one VPN.

65. The Head End of claim 64, wherein the access network is a cable network, and wherein said first and second nodes are cable modems residing on the cable network.

66. The Head End of claim 65 wherein said Head End device includes at least one cable modem termination system (CMTS).

67. The Head End of claim 64 wherein the access network is a wireless network.

68. The Head End of claim 64, wherein said memory is configured or designed to store node ID information relating to the plurality of nodes in the network, each node of the plurality of nodes being uniquely identified by a corresponding node ID.

69. The Head End of claim 64, wherein said memory is configured or designed to store virtual route forwarding information, said virtual route forwarding information including information relating to:

a reference to a first VPN;

a range of node addresses associated with said first VPN; and a next hop for routing packets associated with said first VPN.

70. The Head End of claim 64, wherein said memory is configured or designed to store interface/VPN mapping information, said sub-interface/VPN mapping information including information relating to:

a reference to a first VPN;

interface information associated with said first VPN, said interface information including a reference to a particular sub-interface associated with said first VPN; and a range of node addresses associated with said first VPN.

71. The Head End of claim 68, wherein said memory is further configured or designed to store node ID-VPN mapping information linking a particular node ID to at least one VPN of which the corresponding particular node is a member.

72. The method of claim 71, wherein said node ID-VPN mapping information includes a pointer from a reference designating the particular node ID to a reference specifying the at least one VPN of which the particular node is a member.

73. The Head End of claim 71, wherein the node ID of the particular node is a DOCSIS Service ID for the particular node.

74. The Head End of claim 71, wherein the node ID is a MAC address of the particular node.

75. The Head End of claim 71, wherein the node ID is an IP address associated with the particular node.

76. The Head End of claim 64, wherein said memory is further configured or designed to store VPN routing information, said VPN routing information including a first field identifying at least one range of network addresses, and a second field identifying a next hop associated with said range of network addresses.

77. The Head End of claim 64 wherein said memory is further configured or designed to store VPN-interface information, said VPN-interface information including:

a first field identifying a first VPN;

a second field identifying a sub-interface associated with said first VPN; and a third field identifying an address range associated with said first VPN.

78. The Head End of claim 64, wherein the Head End is further configured or designed to implement a VPN using a Multiprotocol Label Switching Protocol (MPLS).

79. An apparatus for routing packets from a first network node to a second network node in a data network, the data network including an access network having at least one Head End device and a plurality of nodes, the access network further including at least one shared access channel utilized by the first and second nodes to communicate with the Head End device, said first and second nodes being members of a first Virtual Private Network (VPN), said first VPN being associated with at least one first VPN customer edge device, said apparatus comprising:

means for assigning an ID to the first node that is associated with at least one VPN, wherein the ID is assigned by an entity other than the first node;

means for receiving a packet from the first node, said packet including the ID associated with said first node, and including routing information for routing said packet to a destination address associated with said second node;

means for examining the packet to identify the ID of the first node; and using said first node ID to determine whether said first node is associated with at least one VPN.

* * * * *